United States Patent
Alm et al.

(10) Patent No.: US 10,523,613 B1
(45) Date of Patent: Dec. 31, 2019

(54) SYSTEMS AND METHODS FOR MANAGING AND DISPLAYING DISCUSSION CONTENT IN A COLLABORATIVE DATA PROCESSING ENVIRONMENT

(71) Applicant: Jostle Corporation, Vancouver, BC (CA)

(72) Inventors: Justin Alm, Vancouver (CA); Felipe Gasparino, Vancouver (CA); Bradley Palmer, Vancouver (CA)

(73) Assignee: Jostle Corporation (CA)

( * ) Notice: Subject to any disclaimer, the term of this patent is extended or adjusted under 35 U.S.C. 154(b) by 272 days.

(21) Appl. No.: 15/298,796

(22) Filed: Oct. 20, 2016

Related U.S. Application Data

(60) Provisional application No. 62/244,697, filed on Oct. 21, 2015.

(51) Int. Cl.
| | |
|---|---|
| G06F 3/14 | (2006.01) |
| H04L 12/58 | (2006.01) |
| H04L 29/06 | (2006.01) |
| H04L 29/08 | (2006.01) |
| G06F 3/0482 | (2013.01) |

(52) U.S. Cl.
CPC ............ *H04L 51/16* (2013.01); *G06F 3/1454* (2013.01); *H04L 51/10* (2013.01); *H04L 67/10* (2013.01); *H04L 67/42* (2013.01); *G06F 3/0482* (2013.01)

(58) Field of Classification Search
CPC .................................. G06F 3/14; G06F 3/0484
See application file for complete search history.

(56) References Cited

U.S. PATENT DOCUMENTS

| | | | |
|---|---|---|---|
| 6,557,027 B1* | 4/2003 | Cragun | H04L 12/1813 709/204 |
| 6,792,448 B1 | 9/2004 | Smith | |
| 7,475,110 B2 | 1/2009 | Kirkland et al. | |
| 7,725,538 B2 | 5/2010 | Kirkland et al. | |
| 7,904,515 B2 | 3/2011 | Ambati et al. | |
| 8,140,981 B2 | 3/2012 | Gusler et al. | |
| 8,805,935 B2 | 8/2014 | Kirkland et al. | |
| 2005/0149621 A1 | 7/2005 | Kirkland et al. | |
| 2005/0262199 A1* | 11/2005 | Chen | G06Q 10/107 709/204 |
| 2008/0082607 A1 | 4/2008 | Sastry et al. | |
| 2009/0094329 A1* | 4/2009 | Ambati | G06Q 10/10 709/204 |

* cited by examiner

*Primary Examiner* — Andrea C Leggett
(74) *Attorney, Agent, or Firm* — Westberg Law Offices

(57) ABSTRACT

Systems and methods for managing and displaying discussion content in a collaborative data processing environment are disclosed. Posts of discussion participants are displayed within a user interface on display screens of a plurality of discussion participant user devices. An instruction to create a branch of the original discussion is accepted at a particular one of the user devices. An identification of one or more posts of the original discussion is communicated to the server from the particular one of the user devices. A branch discussion and the one or more identified posts of the original discussion are displayed on the display screen of the particular one of the user devices along with a link to the original discussion. A branch discussion data object for the branch discussion is communicated from the server to the plurality of discussion participant user devices.

27 Claims, 22 Drawing Sheets

Discussion Table 350

| ID | Title | Branched From |
|---|---|---|
| 1 | Original | |
| 2 | Branch #1 | 1 |
| | | |

354　　　　　　356　　　　　　358

Discussion Comment Table 352

| ID | Discussion ID | Comment | Duplicate of Comment ID |
|---|---|---|---|
| 1 | 1 | Post 1 | |
| 2 | 1 | Post 2 | |
| 3 | 1 | Post 3 | |
| 4 | 2 | Post 1 | 1 |
| 5 | 2 | Post 3 | 3 |

FIG. 18 jostle

NEWS
EVENTS
DISCUSSIONS (99999)

| ∧ | Category ∨ Most Recent ∨ | + |
|---|---|---|
| | Development (9999) | |
| | Design of the Trade Sh... ⌀ | (9999) |
| | Discussion Title | (9999) |
| | Discussion Title | (9999) |
| | Discussion Title | (9999) |

⊢ 🗎 Design of Trade Show Booth Edit

Participants - Brad, Geoff, Noel, Bruce, Alex, Felipe, & 58 more.

⇨ Participants (5) ∨   🔍   ← 410

| Name | Status | Location | Last Post ∨ | # of Posts |
|---|---|---|---|---|
| Brad Palmer CEO | Moderator | Vancouver, Canada | 5:30PM Mar 20, 2015 | 56 |
| Geoff Huenemann Director Product Development | Invitee | Scottsdale, USA | 5:27PM Mar 20, 2015 | 95 |

400

FIG. 19 jostle

NEWS
EVENTS
DISCUSSIONS (99999)
PEOPLE

| ∧ | Category ∨ Most Recent ∨ | + |
|---|---|---|
| | Development (9999) | |
| | Design of the Trade Sh... ⌀ | (9999) |
| | Discussion Title | (9999) |
| | Discussion Title | (9999) |
| | Discussion Title | (9999) |

⊢ 🗎 Design of Trade Show Booth Edit

Participants - Brad, Geoff, Noel, Bruce, Alex, Felipe, & 58 more.

⇨ Files ∨   🔍   ← 410

| Files (342) | Uploaded ∨ | Type | Size | # Views | Downloads | Via |
|---|---|---|---|---|---|---|
| 2015q1Update.png View Download View in Discussion | Mar 20, 2015 | PNG | 300mb | 24 | 2 | Noel |
| 2015q1Update.pdf View Download View in Discussion | Mar 20, 2015 | PDF | 300mb | 0 | 0 | Justin |

| | Most Recent ⌄ | + | | | |
|---|---|---|---|---|---|
| Category ⌄ | | | 🔗 Design of Trade Show Booth Edit | | |
| Development (9999) | | | Participants - Brad, Geoff, Noel, Bruce, Alex, Felipe, & 58 more. | | |
| Design of the Trade... 🔔 (9999) | | | Links (984) | Favorites Type | Date ⌄ Via |
| Discussion Title (9999) | | | https://trello.com/b/9ZFzqYN/de-sign-for-dev | ☆ Trello | Mar 20, 2015 (Noel) Noel |
| Discussion Title (9999) | | | Noel Heaney's comment | ☆ Comment | Mar 20, 2015 (Justin) Justin |
| Discussion Title (9999) | | | | | |
| Discussion Title (9999) | | | https://www.dropbox.com/home/jos-tle%20Inventor%20Materials | ☆ Dropbox | Mar 20, 2015 (Geoff) Geoff |
| Discussion Title (9999) | | | | | |
| Discussion Title (9999) | | | Noel Heaney's comment | ☆ Comment | Mar 20, 2015 (Brad) Brad |
| Discussion Title (9999) | | | | | |
| Discussion Title (9999) | | | https://docs.google.com/document/d/1Gi-Ru-FlaBaboh1ktu6lt4k5xYXqC6yA- cc1jdl6hOQ/edit# | ☆ Google Doc | Mar 20, 2015 (Grey) Grey | jostle

NEWS
EVENTS
DISCUSSIONS (99999)
PEOPLE
LIBRARY
TEAMS
CLASSIFIEDS 400
410 → Links ⌄ jostle

... | ∧ Most Recent ∨ +

NEWS
EVENTS
DISCUSSIONS (54)
PEOPLE
LIBRARY
TEAMS
CLASSIFIEDS

Category ∨
Development (9999)

Intranet ROI Infographic (15)
New DISCUSSION... ⌀(37)
Sally Smith & Bradi... (4)
1:1 Felipe & Justin (2)
1:1 Tomas & Justin
1:1 Deb & Justin
Brandification On...
Deb, Jess, & Justin
1:1 Brad & Justin
DISCUSSIONS Developm...
Yammer vs Jostle C...
1:1 Don & Justin
Quote Styles
1:1 Jessica & Justin
NEW DISCUSSIONS...
NEWS Improvemen...
1:1 Alex & Justin
1:1 Chanaka & Justin
1:1 Walt & Justin Edit | Visibility ∨ 🔍 —410

🗨 New DISCUSSIONS Design Edit

Participants - Brad, Geoff, Noel, Bruce, Alex, Felipe, & 58 more.

Visibility

Discoverable?
Contributors to <<Intranet Name>> can view this Discussion via Search?
⦿ Yes  ○ No

Invited to Follow this Discussion

Intersection - Membership will change as Contributors join/leave components 83 people are included in this Intersection —522

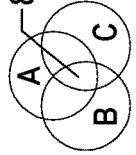

ⒶⒷⒸ

Ⓐ - Locations
• BC (non-employees)
• Virginia

Ⓑ - Org Units
• Board
• Design
• Dev
• DevOps
• Marketing
• Ops
• SRED reporters Ⓒ - Departments
• Jostle Employees (Board members/observers)
• Jostle Employees (investors)
• Jostle Employees (other)
• Jostle Investors (other)
• Jostle Associates
• Test

Individuals
 Brad Palmer
CEO

83 Contributors see this <<Discussion Title>>

|  | Invitees | All Other Users |
|---|---|---|
| Private (Not Discoverable) | Can View and Participate | Not Discoverable or Viewable |
| Discoverable | Can View and Participate | Can Find via Search and View |

|   |   |
|---|---|
| | Brad Palmer —544  542 |
| | CEO —546 |
| | △ External Contributor |
| | ☐ Custom Contributor  } 548 |
| | ○ Online now in Washington, DC |
| | View Profile  550 |
| ‹ Most Recent ⌄  + | Archiv... Goto 1-on-1 Discussion  552 |
| Discussion Title (9999) | ⌐🔒 D... Start Google Hangout  554 |
| Brad, Geoff, No... 🔕 (9999) | Participants - Send Email  556 |
| Sally Smith & Brad... (9999) | Discu... |
| Discussion Title (9999) | Recognize via Shout-Out  558 |
| Discussion Title (9999) | Justin Alm created the branch "Private Discussion #2" |
| Discussion Title (9999) | 540 |

FIG. 26

⌐🔒 Design of Trade Show Booth  Edit
Participants - Brad, Geoff, Noel, Bruce, Alex, Felipe, & 58 more.

Discussion started with Brad Palmer, Geoff Huenemann, Noel Heaney and You. 3:23PM

Brad Palmer
☑ This is the new DISCUSSIONS layout!
☑ Can't wait to test the branching mechanic!

Justin Alm created the branch "Private Discussion #2"  3:23PM

Geoff Huenemann
☐ It was a lot of work getting this together but I'm glad to see dev is finished and we're getting ready to get this on production

Justin Alm
☑ Yeah man, this is pretty sick. So pumped to be using this

Felipe Gasparino joined the Discussion.  3:23PM
Bruce Milton joined the Discussion.

Noel Heaney
☐ Yeah man, this is pretty sick. So pumped to be using this
☐ Yeah man, this is pretty sick. So pumped to be using this Justin Alm linked Noel's Comment in the Discussion "Private Discussion #2"  3:23PM

| New Branch Title | 560 | Create Branch | —562 |

FIG. 27

| ... | > | Most Recent ∨ | + | ⌀ Leave  Branch  Set Category ∨ | | Branches ∨ | ⚲ |
|---|---|---|---|---|---|---|---|
| *jostle* | Category ∨ | | | ⊤⌂ Unique Awesome Name  Edit | | | |
| NEWS | Development (9999) | | | Participants - Brad, Geoff, Noel, Bruce, Alex, Felipe, & 58 more. | | | |
| EVENTS | Unique Awesome Name | ③ | | Origin Discussion | # Members | Last Active | Created |
| DISCUSSIONS (99999) | Design of the Trade Sho... ⌀ (9999) | | | Design of the trade Show Booth | 45 | 03/02/15 | 03/02/15 |
| PEOPLE | Discussion Title | (9999) | | Related Branches | # Members | Last Active ∨ | Created |
| | Discussion Title | (9999) | | No Branches have been made from this Discussion yet. | | | |
| | Discussion Title | (9999) | | | | | |

SYSTEMS AND METHODS FOR MANAGING AND DISPLAYING DISCUSSION CONTENT IN A COLLABORATIVE DATA PROCESSING ENVIRONMENT

This application claims the benefit of U.S. Provisional Application No. 62/244,697, filed Oct. 21, 2015, the entire contents of which are hereby incorporated by reference herein.

BACKGROUND OF THE INVENTION

The present invention relates to the field of data processing and computing. More particularly, the present invention relates to managing and displaying discussion content in a collaborative data processing environment.

In a data processing environment, messaging among discussion participants can be accomplished by text or email messaging, online chat services, or through collaborative editing of electronic documents. These conventional methods have advantages and disadvantages, depending upon the circumstances. For example, email messaging provides an explicit record of each participant's contribution to a discussion, though it can be difficult to locate specific topics or information at a later time and the chronology of different contributions often becomes fragmented. The ability to access historic records is further limited in that each participant has access only to messages that were originally sent to or from that participant. Email messaging is generally also not implemented in real-time since downloads of a particular participant's incoming messages only occurs intermittently from a remote server. Chat services can overcome some of the drawbacks associated with email messaging, though chat can have its own drawbacks. For example, chat participants can have difficulty keeping track of discussions when they become involved of a number of different discussions. Files and other information shared by chat participants can also be difficult to access, organize and reference at a later time.

What is needed is an improved system and method for managing and displaying discussion content in a collaborative data processing environment.

SUMMARY OF THE INVENTION

The present invention is directed toward systems and methods for managing and displaying discussion content in a collaborative data processing environment. In accordance with an embodiment, a method of managing and displaying discussion content in collaborative data processing environment is provided. Posts (contributions to the discussion) of discussion participants are displayed within a user interface on a display screen of a plurality of discussion participant user devices. The user devices are communicatively connected to a server wherein the server communicates an original discussion data object to the user devices. The original discussion data object includes the posts of an original discussion. An instruction to create a branch of the original discussion is accepted at a particular one of the user devices. An identification of one or more posts of the original discussion is communicated to the server from the particular one of the user devices. A branch discussion and the one or more identified posts of the original discussion are displayed on the display screen of the particular one of the user devices along with a link to the original discussion. A branch discussion data object for the branch discussion is communicated from the server to the plurality of discussion participant user devices.

This embodiment as well as other embodiments are described in more detail herein.

BRIEF DESCRIPTION OF THE DRAWINGS

The present invention is described with respect to particular exemplary embodiments thereof and reference is accordingly made to the drawings in which:

FIG. 11 illustrates database tables used by the server for storing discussion data, including branched discussions, in accordance with an embodiment of the present invention;

FIG. 12 illustrates a user interface for display of discussion content having three information content columns in accordance with an embodiment of the present invention;

FIG. 18 illustrates a user interface for a "Participants" view mode of a discussion sandbox in accordance with an embodiment of the present invention;

FIG. 19 illustrates a user interface for a "Files" view mode of a discussion sandbox in accordance with an embodiment of the present invention;

FIG. 20 illustrates a user interface for a "Links" view mode of a discussion sandbox in accordance with an embodiment of the present invention;

FIG. 22 illustrates a user interface for a "Visibility" view mode of a discussion sandbox for a discoverable discussion in accordance with an embodiment of the present invention;

FIG. 23 illustrates a modal window for displaying an intersection of subgroups accordance with an embodiment of the present invention;

FIG. 24 illustrates how a discoverability setting for a discussion affects its visibility to users in accordance with an embodiment of the present invention;

FIG. 25 illustrates a discussion accessed via a search in accordance with an embodiment of the present invention;

FIG. 26 illustrates displayed information of a contributor in accordance with an embodiment of the present invention;

FIG. 27 illustrates selection and input fields for creation of a branch discussion in accordance with an embodiment of the present invention;

FIG. 29 illustrates a branches view for the newly-created branch discussion in accordance with an embodiment of the present invention; and FIG. 30 illustrates a user interface menu for copying a link to a post, emailing a link to a post or deleting a post in accordance with an embodiment of the present invention.

DETAILED DESCRIPTION OF A PREFERRED EMBODIMENT OF THE INVENTION

The present invention is directed toward systems and methods for managing and displaying discussion content in a collaborative data processing environment. As used herein, the term "discussion" refers to an online written conversation, which can include textual comments (also referred to as "posts") of participants as well as the exchange of files and other information, such as documents, media files and links to documents and media files. Posts can include metadata, such as date, time and author, as well as gestures, such as likes and votes. In accordance with embodiments of the present invention, discussions are implemented dynamically and allow participants to share comments, links and files and also allow participants to branch a discussion, for example, when a subtopic occurs in the discussion or, as another example, when there is a fork in the topics of the discussion. Participants can engage in discussions in real-time such that posts, branches and new topics are immediately available to participants of a discussion. Discussions can also occur asynchronously (sporadically over extended periods of time) with participants periodically getting up-to-date by viewing prior posts and then possibly making a new post. Thus, the present invention advantageously works well for both real-time and asynchronous discussions.

In accordance with embodiments of the present invention, discussions are hosted by an organization which can save and preserve a history of the discussions. Contents of the saved history, including media shared during discussions, can be searched and accessed in a variety of different ways.

Figure 1:
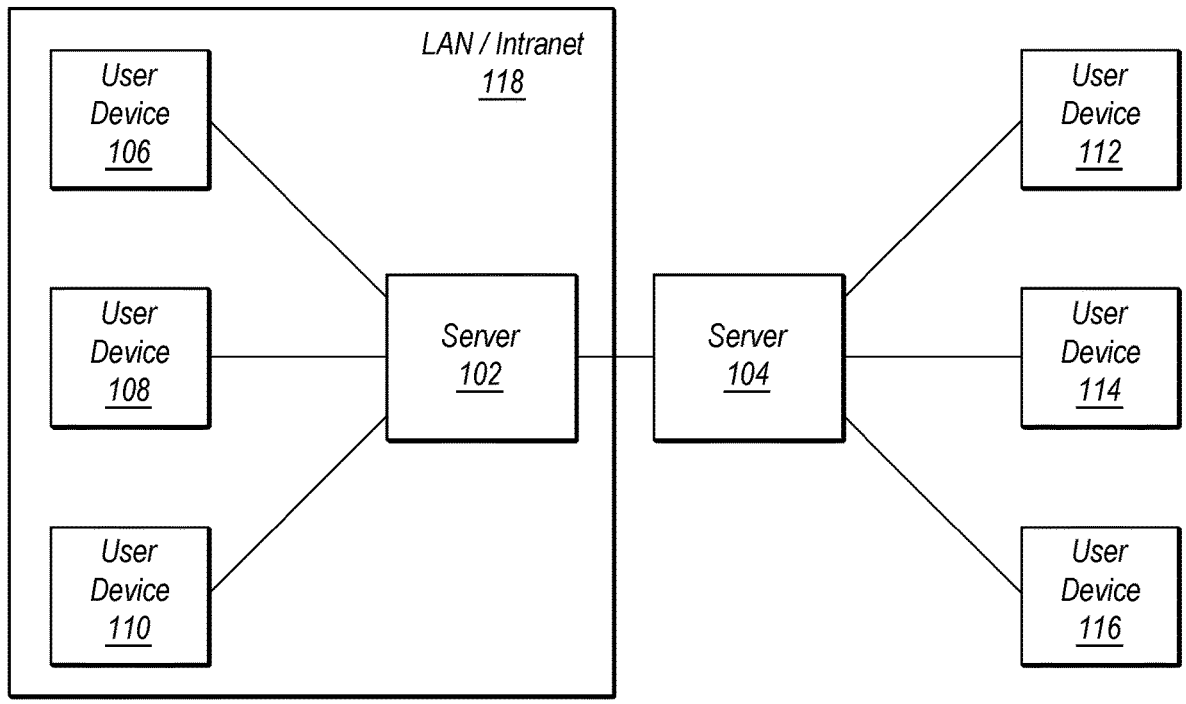
FIG. 1 illustrates a block schematic diagram of a collaborative data processing system having facilities for managing and displaying discussion messages in accordance with an embodiment of the present invention.

FIG. 1 illustrates a block schematic diagram of a collaborative data processing system having facilities for managing and displaying discussion content in accordance with an embodiment of the present invention. Servers 102, 104 and user devices 106, 108, 110, 112, 114, 116 are communicatively coupled to one another, directly or indirectly, such as via wired, wireless or mixed wired and wireless communication links and communication services. For example, server 102 can be coupled to user devices 106, 108, 110 via a local area network (LAN) or intranet 118. Server 104 can be coupled to devices 112, 114, 116 via a wide area network (WAN) such as the Internet. Servers 102 and 104 can be communicatively coupled to each other, for example, via an internet service provider (ISP). Servers 102, 104 can implemented, for example, by multiple servers, server clusters or farms. The user devices 106, 108, 110, 112, 114, 116 can be similar or disparate types of devices, including for example, laptop, desktop or notebook personal computers, mobile computing devices, such as mobile phones, smartphones or tablets.

Figure 2:
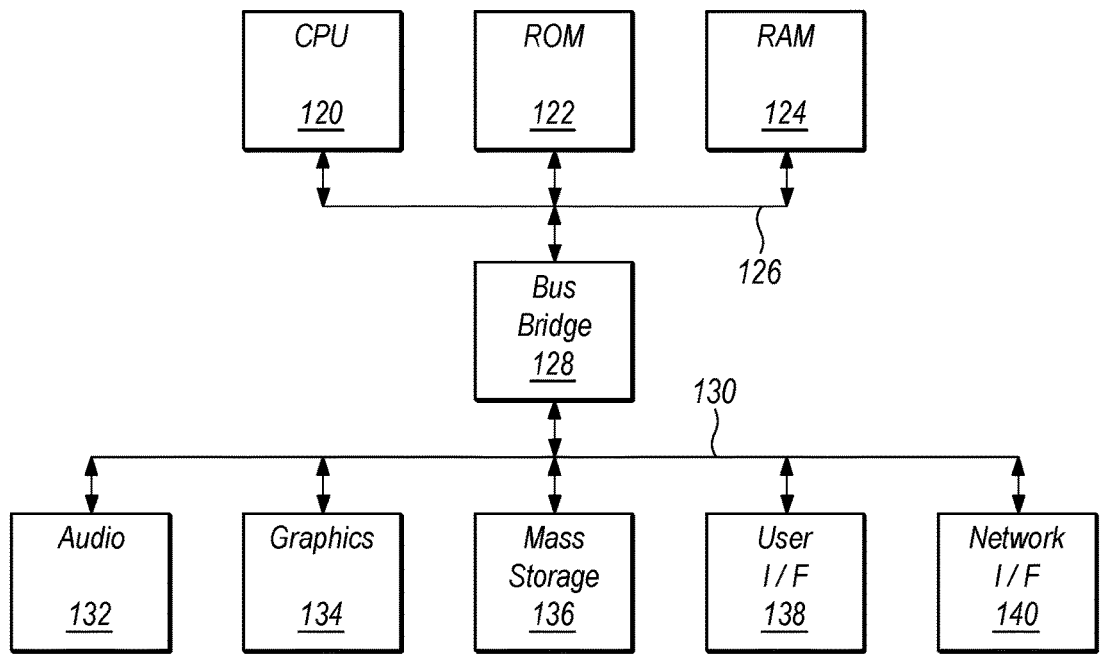
FIG. 2 illustrates a block schematic diagram of a computing device that can be used in a collaborative data processing system in accordance with an embodiment of the present invention.

FIG. 2 illustrates a block schematic diagram of a computing device that can be used in a collaborative data processing system in accordance with an embodiment of the present invention. The computing device of FIG. 2 can be used, for example, in the place of any of the servers 102, 104 or user devices 106, 108, 110, 112, 114, 116 of FIG. 1. A central processing unit (CPU) 120, a read-only memory (ROM) 122 and a random access memory (RAM) 124 are coupled to a first bus 126. The bus 126 is coupled by a bus bridge 128 to a second bus 130. An audio adapter 132, graphics adapter 134, mass storage 136 (e.g., one or more hard disk drives or solid-state drives), user interface 138 (e.g., keyboard, mouse, display), and network interface 140 (e.g., LAN interface, wireless adapter) are coupled to the second bus 130.

Each of the servers 102, 104 and user devices 106, 108, 110, 112, 114, 116 also includes software programs (e.g. operating systems, application programs) that are stored by the respective server or user device (e.g., in mass storage 136) or elsewhere in the system and that can be retrieved from the storage and loaded into volatile storage (e.g., RAM 124) and executed (e.g., by CPU 120). The examples of FIGS. 1 and 2 are illustrative and are not intended to be limiting of possible embodiments of the present invention.

Figure 3:
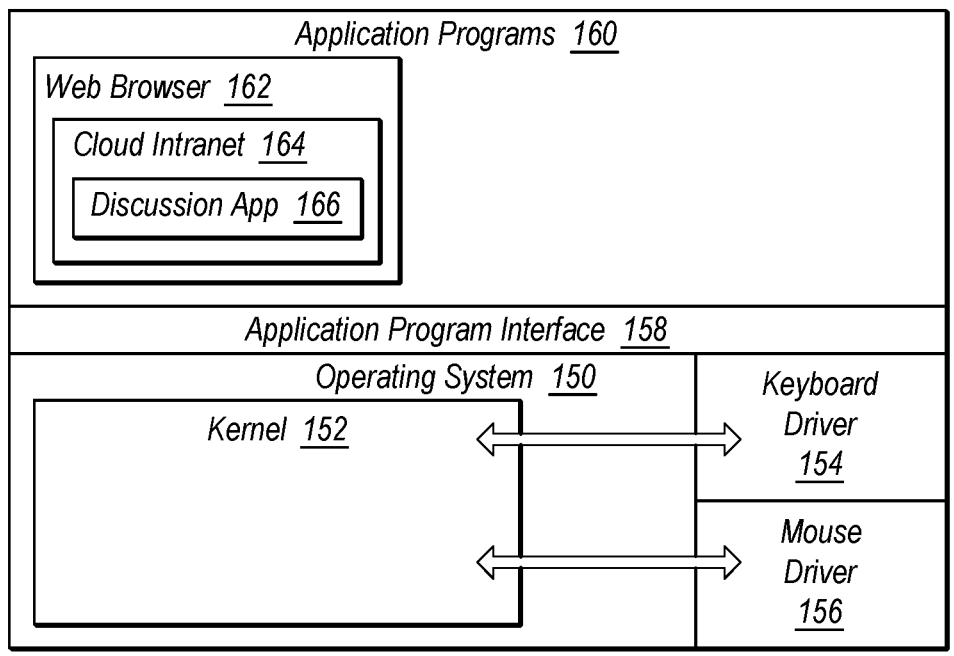
FIG. 3 illustrates a multi-layered software architecture that can be used in a collaborative data processing system in accordance with an embodiment of the present invention.

FIG. 3 illustrates a multi-layered software architecture that can be used in a collaborative data processing system in accordance with an embodiment of the present invention. As shown in FIG. 3, operating system software 150 manages computer hardware and software resources by functioning as an intermediary between them. A kernel 152 in the operating system level provides input and output hardware functions, memory allocation and services for computer programs. Also provided at the operating system level are hardware device drivers, such as a keyboard driver 154 and mouse driver 156 that provide an interface for hardware devices.

An application program interface (API) 158 includes a set of software routines and protocols through which the application programs 160 request services from the operating system 150. As shown in FIG. 3, application programs 160 can include a web browser 162. A cloud-based intranet service 164 can be accessed using the browser 162. A discussion application 166 can be included within the service 164. Alternatively, a discussion application can be deployed that functions without use of the cloud intranet 164.

The data processing system illustrated in FIG. 1 can employ a client/server type architecture in which the user devices 106, 108, 110, 112, 114, 116 function as clients to servers 102, 104. The servers 102, 104 can perform centralized functions such as data storage and management, including storage and management of discussion content, as well as interfacing with user devices 106, 108, 110, 112, 114, 116 to receive data, including individual posts, from the user devices 106, 108, 110, 112, 114, 116, and providing data, including discussion content, to the user devices 106, 108, 110, 112, 114, 116. The user devices 106, 108, 110, 112, 114, 116 can function to provide a user interface for individual discussion participants, for example, by displaying discussion content on a display screen for viewing by a discussion participant and by providing an interface by which the user can type textual posts, optionally with attached or embedded content, and to transmit the posts to one or both of the servers 102, 104 for storage and management by the server(s) 102, 104.

In operation, a number of discussion participants each initiate an application program on their respective user device 106, 108, 110, 112, 114, 116, through which discussion services provided by servers 102, 104 are accessed. The application program can be, for example, any or all of the web browser 162, cloud intranet 164 or discussion application 166 illustrated in FIG. 3. Additionally, a server 102, 104, which is in communication with the user devices of the participants, maintains and manages the content of the discussion and coordinates communication with each participant user device to display information pertinent to the discussion on the user devices' display screens and to receive individual contributions to the discussion (i.e. posts).

Figure 4:
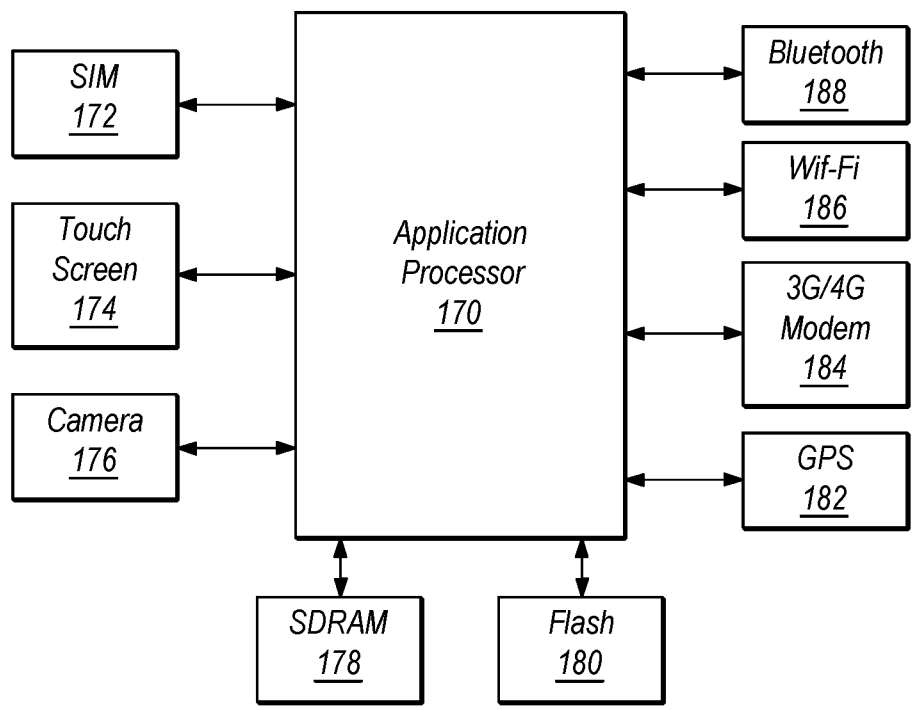
FIG. 4 illustrates a block schematic diagram of a mobile computing device that can be used in a collaborative data processing system in accordance with an embodiment of the present invention.

FIG. 4 illustrates a block schematic diagram of a mobile computing device that can be used in a collaborative data processing system in accordance with an embodiment of the present invention. As shown in FIG. 4, the device includes an application processor 170, a subscriber identity module (SIM) 172, a touch screen 174, a camera 176, SDRAM 178, flash memory 180, a global positioning system (GPS) module 182, a 3G/4G modem 184, a Wi-Fi transceiver 186, and a short-wavelength communication module 188 (e.g. Bluetooth). It will be apparent that the mobile device of FIG. 4 is exemplary and that changes can be made to its components and architecture. The mobile device of FIG. 4 can be used, for example, in the place of any of the user devices 106, 108, 110, 112, 114, 116 of FIG. 1.

Figure 5:
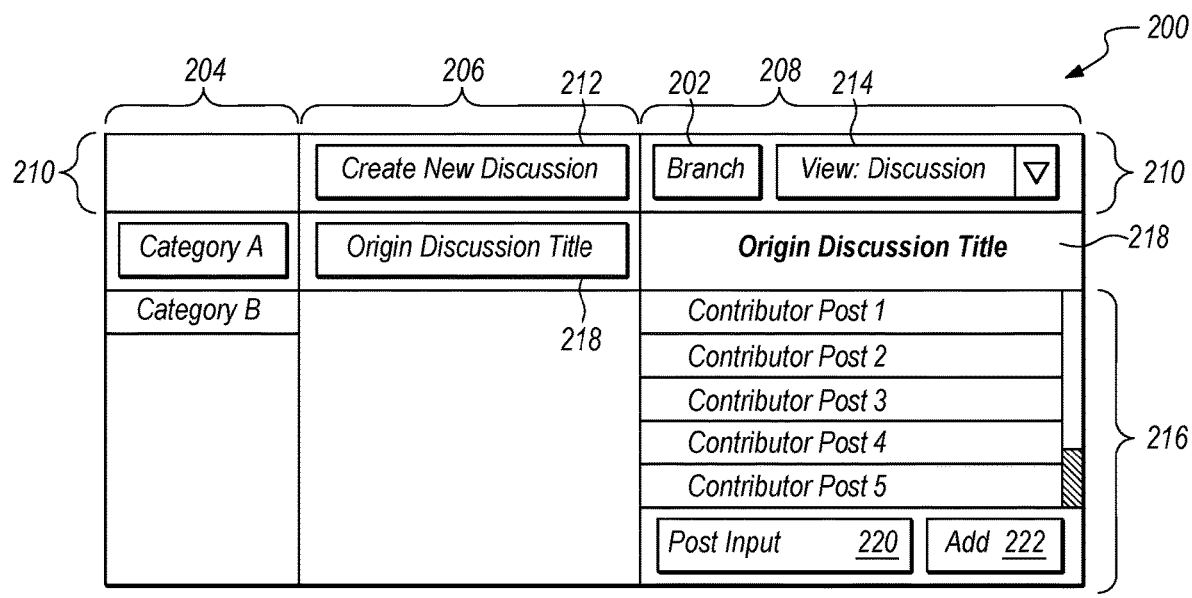
FIG. 5 illustrates a user interface for display of discussion content having a branch control in accordance with an embodiment of the present invention.

FIG. 5 illustrates a graphical user interface 200 for display of discussion content in accordance with an embodiment of the present invention. The interface 200 appears on a display screen of user devices 106, 108, 110, 112, 114, 116. The interface 200 includes a branch control button 202 and displays discussion content. The branch control button 202 is activated, for example, by positioning a cursor over the button 202 and clicking or by touching the button 202 on a touch-screen of a touch-screen equipped user device. As also shown in FIG. 5, the graphical user interface includes three columns for displaying discussion information, including a discussion categories column 204, a discussions column 206 and a discussion workspace area or "sandbox" 208. The branch control button 202 can be included in an action bar 210 which appears as a top-most row of the columns 204, 206, 208.

The categories column 204 displays titles of one or more categories of discussions, which are preferably arranged in a vertical column. Each category can correspond to one or more discussions shown in the discussion column 206 and, thus, the discussions can be organized according to categories. Two categories are shown in FIG. 5: "Category A" and "Category B." The categories are selectable, for example, by positioning a cursor over the category name and clicking on it or by touching a touch-screen of a touch-screen equipped user device. As shown in FIG. 5, "Category A" is highlighted and is, therefore, the currently-selected category.

The discussions column 206 includes a list of discussion titles within a selected category. The discussion titles are also preferably arranged vertically. Because "Category A" is the currently-selected category, the discussion titles appearing in the discussions column 206 are discussions within "Category A." Within the selected category, the title of a discussion with a most-recently published comment preferably appears at the top of the list by default. The discussions column 206 can be sorted differently by selecting a different setting (e.g. alphabetical instead of most-recent) from a dropdown menu 450 (FIG. 12) in the action bar 210. A create new discussion button 212 is preferably positioned above the discussions list in the action bar 210. Activation of this button 212 allows the user to create a new discussion to be added to the list. Individual discussions appearing in the list of discussions are selectable, for example, by positioning a cursor over the discussion title and clicking on it or by touching a touch-screen of a touch-screen equipped user device. As shown in FIG. 5, "Origin Discussion Title" is highlighted and is, therefore, the currently-selected discussion.

Contents of a selected discussion can be displayed in the discussion sandbox 208. The default view of the discussion sandbox 208 is preferably of posts of a selected discussion. A drop-down menu 214, which can be positioned within the action bar 210, allows a user to selectively change the information displayed in the sandbox 208. As shown in FIG. 5, the user can choose to display any of the following modes in the sandbox 208: "Discussion," "Participants," "Files," "Links," "Branches," and "Visibility." The "Discussion" display mode is shown in FIG. 5. Other display modes are described herein.

In accordance with the "Discussion" mode being selected, posts contributed to the currently-selected discussion by participants of the discussion are displayed. The posts 216 are preferably arranged in chronologic order from top to bottom in a vertical column beneath the title 218 of the current discussion. If the posts 216 don't fit in the display area, the list preferably scrolls. The device user can enter a new post to be contributed to the discussion by entering text in an input field 220. The input field 220 can also be used to attach files. When selected, an add button 222 publishes the post entered in the field 220 to other participants in the discussion. The add button 222 is selected by positioning a cursor over the button 222 and clicking or by touching a touch-screen of a touch-screen equipped user device.

Each device user can access the discussions of which the user is a participant. Thus, while each user's device 106, 108, 110, 112, 114, 116 generally shows the same interface 200, the categories, discussions, and posts that are available for viewing by a particular user will generally be limited to discussions to which that user is a participant. More particularly, in a preferred embodiment, two tiers of viewing privileges can be provided. One is view-only in which a user can find a particular discussion via search and then choose to "follow" it. Only if the user chooses to follow a discussion does the discussion appear in the user's list 206 going forward. The other tier includes users invited to participate in the discussion. For these users, the discussion appears in list 206 with no need to "follow" first. These users are able to participate by adding posts if they want. Followers are essentially lurkers. They need to request to the moderator to become a participant before they can post. This is useful, for example, for a strategic discussion that an organization's leadership team wants to be transparent on, but does not want people randomly chiming in, which could create confusion for all.

Figure 6:
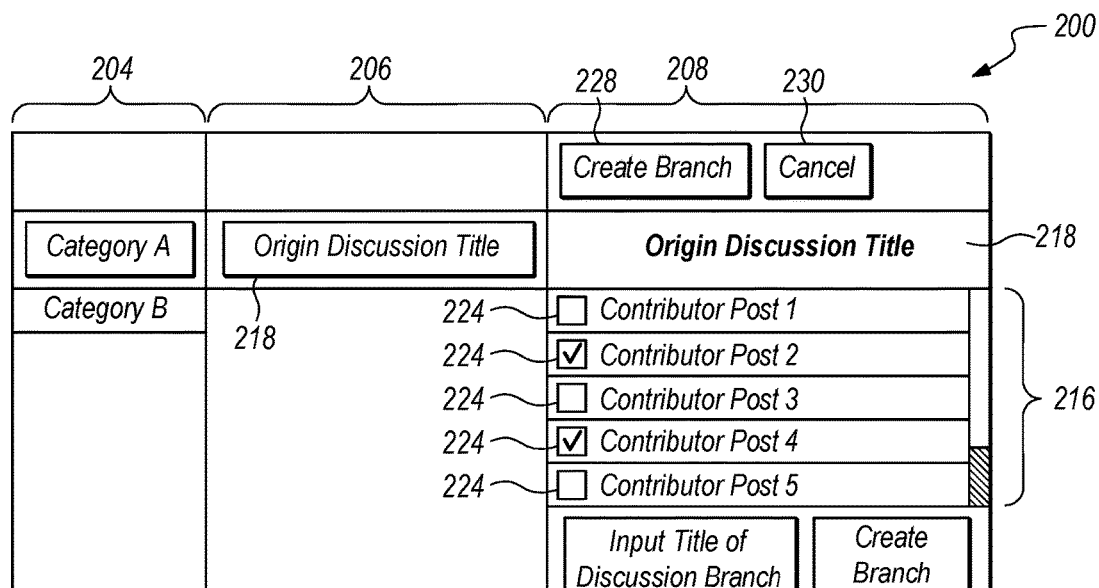
FIG. 6 illustrates the user interface for display of discussion content upon activation of the branch control in accordance with an embodiment of the present invention.

FIG. 6 illustrates the user interface 200 for display of discussion content upon activation of the branch control in accordance with an embodiment of the present invention. This shows an embodiment of the interface 200 that results when the branch control button 202 of FIG. 5 is activated by the device user. As shown in FIG. 6, check boxes 224 appear adjacent to each of the displayed contributor posts 216. The check boxes 224 allow the user to select individual posts 216 from the original discussion to be added to the newly-created branch discussion. (The terms "original" and "branch" are used to characterize relationships among discussions; a particular discussion can be both an "original" discussion with respect to other, branched discussions and can simultaneously be a "branch" discussion with respect to a discussion from which it was branched). The device user can enter a title for the new branch discussion in an input field 226. In an embodiment, if the user does not enter a title, a default title is provided, e.g. "Branched from <<Origin Discussion Title>>." When selected, a "create branch" button 228 completes the initialization of the branch discussion. The "create branch" button 228 is selected by positioning a cursor over the button 228 and clicking or by touching a touch-screen of a touch-screen equipped user device. Alternatively, prior to selecting the "create branch" button 228, the user can cancel the creation of the new branch by activating a "cancel" button 230. FIG. 6 shows two create branch buttons 228 though it will be apparent that one of them can be omitted.

Figure 7:
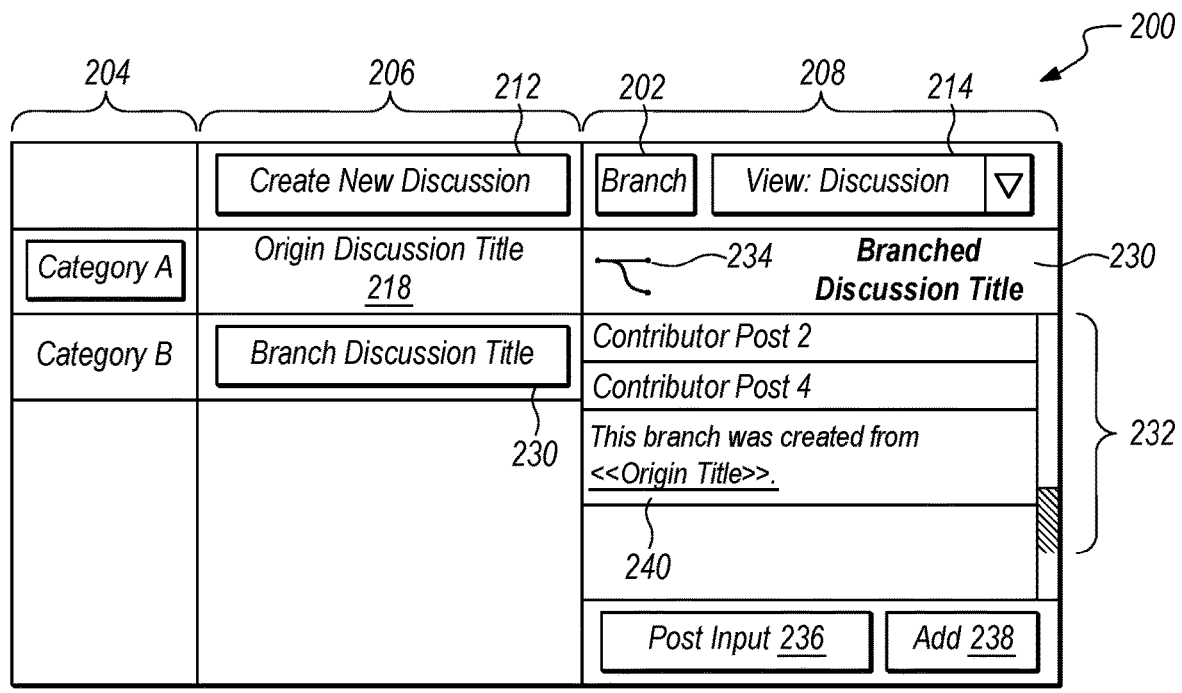
FIG. 7 illustrates the user interface for display of discussion content having a newly created branch discussion in accordance with an embodiment of the present invention.

FIG. 7 illustrates the user interface 200 showing a newly-created branch discussion in accordance with an embodiment of the present invention. As shown in FIG. 7, a title 230 given to the newly-created branch discussion by the device user now appears in the discussions list in the discussions column 206. As shown in FIG. 7, the newly-created branch discussion title 230 is highlighted so that its title 230 also appears in the sandbox 208. In an embodiment, the newly-created branch discussion automatically becomes the currently-selected discussion by default following its creation. Contributor posts 232 selected from the original discussion, from which the branch discussion was branched, can also appear in the sandbox 208. The posts 232 appear in a vertical column beneath the title 230. Adjacent to the branch discussion title 230, a symbol 234 can appear which signifies that the discussion is branch discussion. In addition, the discussions column 206 can display the original discussion title 218 from which the branch discussion was branched. The title of the branch discussion preferably appears in the discussions column 206. Any of the discussion titles appearing in the discussions columns 206 can be selected, in which case, it will become the currently-selected discussion and the posts of that currently-selected discussion will appear in the sandbox 208.

Once the branch discussion is created, the user devices of all participants in the branch discussion will be able to view and access the branch discussion as shown in FIG. 7 and to contribute new posts to the branch discussion. The branch discussion can also be discoverable to other users by searching, in which case, those users can choose to follow the discussion as a follower.

As shown in FIG. 7, the newly-created branch discussion is now ready to receive new posts from discussion participants. A device user can enter a new post to be contributed to the branch discussion in an input field 236. When selected, an add button 238 publishes the post entered in the field 236 to other participants of the branch discussion. The add button 238 is selected by positioning a cursor over the button 238 and clicking or by touching a touch-screen of a touch-screen equipped user device.

In an embodiment, discussion participants are prevented from replying to earlier discussion posts. In this case, the posts of a discussion are simply displayed in chronological order with each new post continuing the discussion and occupying the most-recent position in the chronological order. A participant can selectively create a new branch discussion that is branched from any one or more posts of the discussion. The branched discussion may then also have the restriction that participants are prevented from replying to earlier discussion posts though they can create branches from any one or more posts of the branch discussion. This advantageously causes each discussion to proceed in an easy-to-follow linear format, but still allows discussions to diverge via branching as needed.

In a further embodiment, it is possible to reply to an earlier discussion post, but the reply is only displayed in its correct chronological position in the overall discussion. In this case, when the 'reply' is posted it will occupy the most-recent position in the chronological order, but be identified as being a reply to the earlier post. This advantageously allows for simple replies in the chronologic stream of the original discussion such that branches only need to be created when a new discussion topic needs to be split out from the original discussion.

Figure 8:
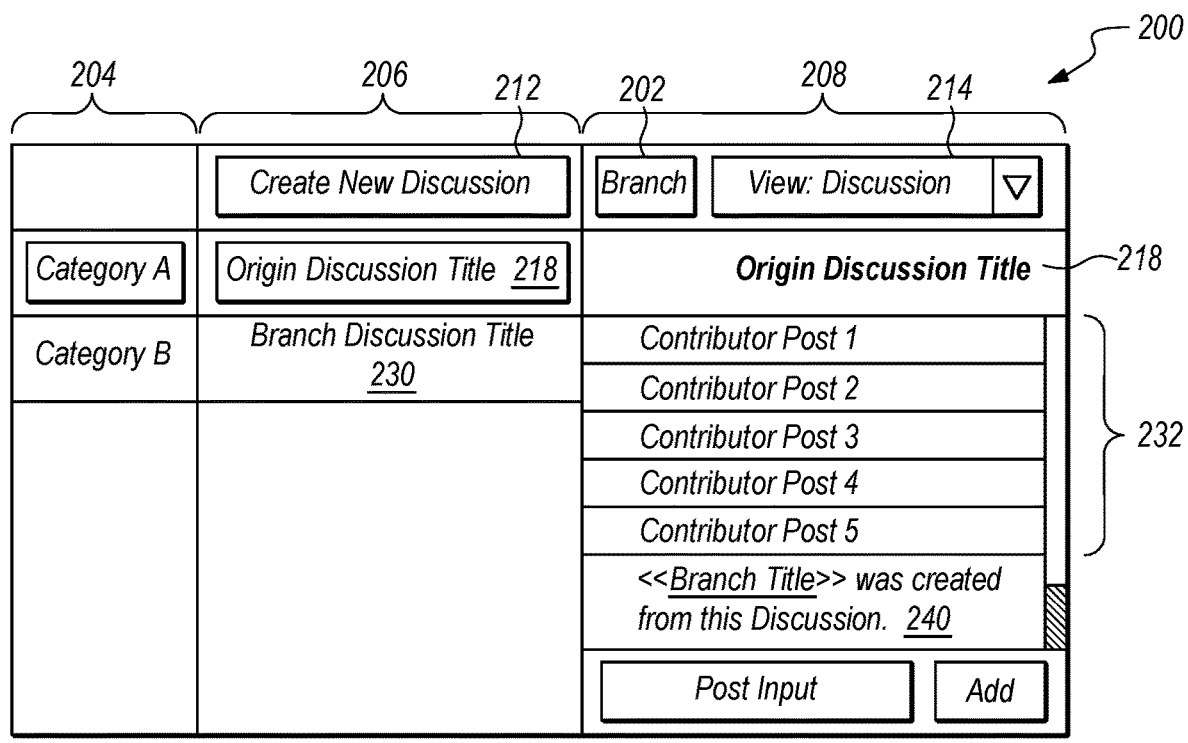
FIG. 8 illustrates the user interface for display of discussion content including an original discussion and connected branch discussion in accordance with an embodiment of the present invention.

FIG. 8 illustrates the user interface 200 showing an original discussion and associated branch discussion in accordance with an embodiment of the present invention. In FIG. 8, the original discussion is selected, as shown by the original discussion title being highlighted. Thus, posts of the original discussion are shown in the sandbox 208. Preferably, an indication that the discussion has been branched is also displayed on the devices of all participants of the discussion to inform the discussion participants of the branch. As shown in FIGS. 7 and 8, a message 240 (also referred to as an "event bar") appears in the post timeline that informs discussion participants in both the original discussion and branched discussion of the branch. This event bar 240 preferably appears in the timeline of posts according to the time it was created and preferably also includes a link to the branch discussion.

Figure 9:
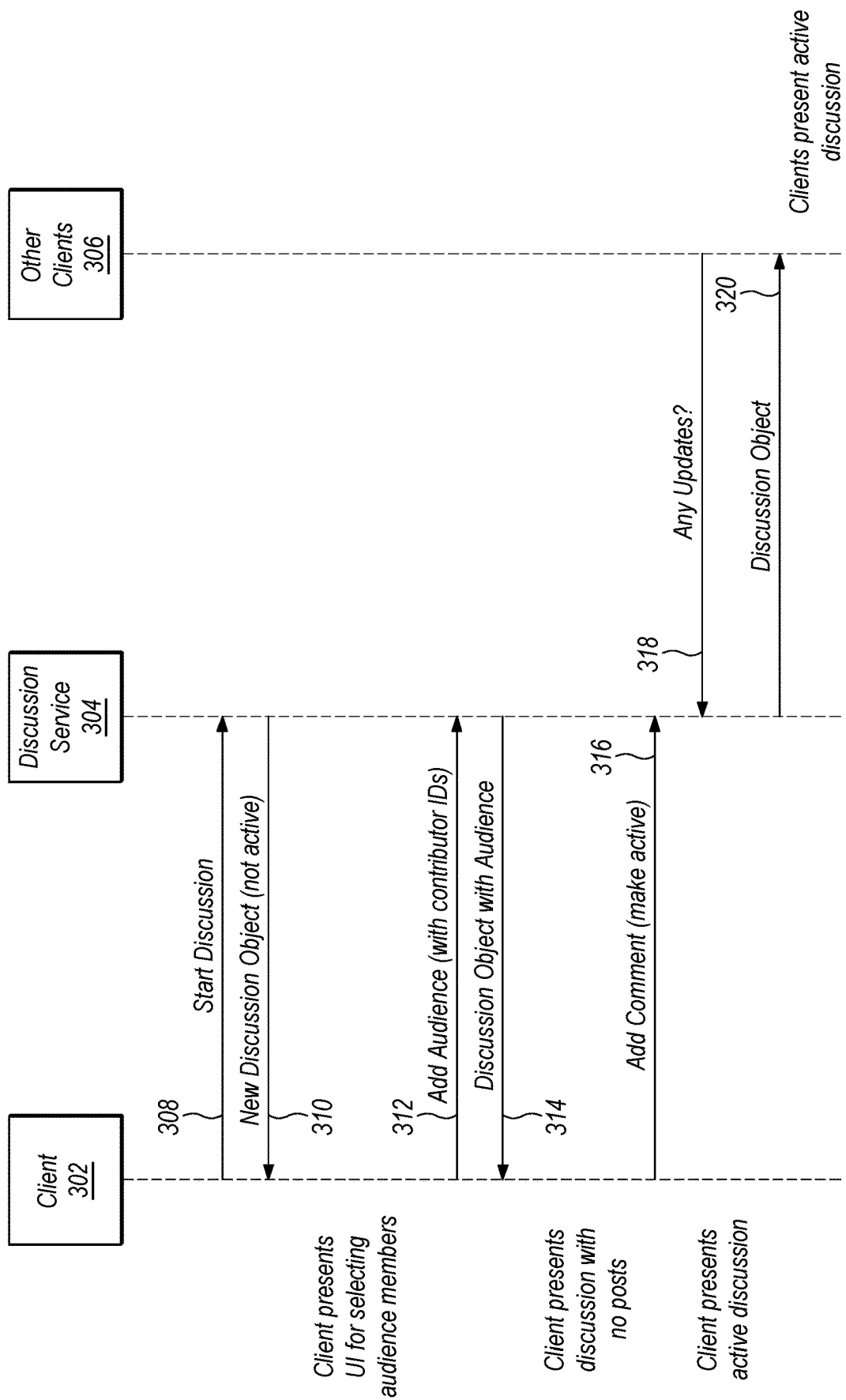
FIG. 9 illustrates message communication between server and user device during creation of a new discussion in accordance with an embodiment of the present invention.

FIG. 9 illustrates message communication between server and user devices during creation of a new discussion in accordance with an embodiment of the present invention. FIG. 9 shows a client 302 that initiates creation of the new discussion, a discussion service 304 and other clients 306 that participate in the discussion. The clients 302, 306 can correspond to any of user devices 106, 108, 110, 112, 114, 116, shown in FIG. 1, while the discussion service 304 can correspond to any of servers 102, 104, shown in FIG. 1.

To create a new discussion, the client 302 sends a message 308 to the discussion service 304 that informs that service 304 that the client 302 wishes to start a new discussion. In response, the service 306 sends a message 310 to the client 302 that includes a new discussion data object. The new discussion data object represents the new discussion and is indicated as not active at this point. In response to receiving the new discussion data object, the client 302 presents the user with a user interface on a display screen of the user device that allows the user to select participants for the new discussion being created. The client 302 then sends a message 312 to the service 304 that informs the service of the selection of participants and identifies those participants. The service 304 responds by sending a message 314 to the client 302 that includes the discussion object which is now updated with identification of the discussion participants.

Next, the client 302 user interface accepts a first post to commence the newly-created discussion and a message 316 is sent from the client 302 to the service 304 that includes the first post. The discussion is now active. Meanwhile, clients 306 periodically check in with the service 302 to receive updated information for discussions in which each particular client is a participant. In response, the service 304 informs the clients of updates (e.g., new posts for existing discussions, and notices of newly-created discussions). Here, the service 304 responds to such a request for updates message 318 received from client 306 by sending a message to the client 306 that includes the discussion object for the newly-created discussion. The client 306 then presents the user with a user interface (e.g., as in FIG. 5) that shows the new discussion and that allows the user to participate in the discussion by reviewing posts and making new posts.

Figure 10:
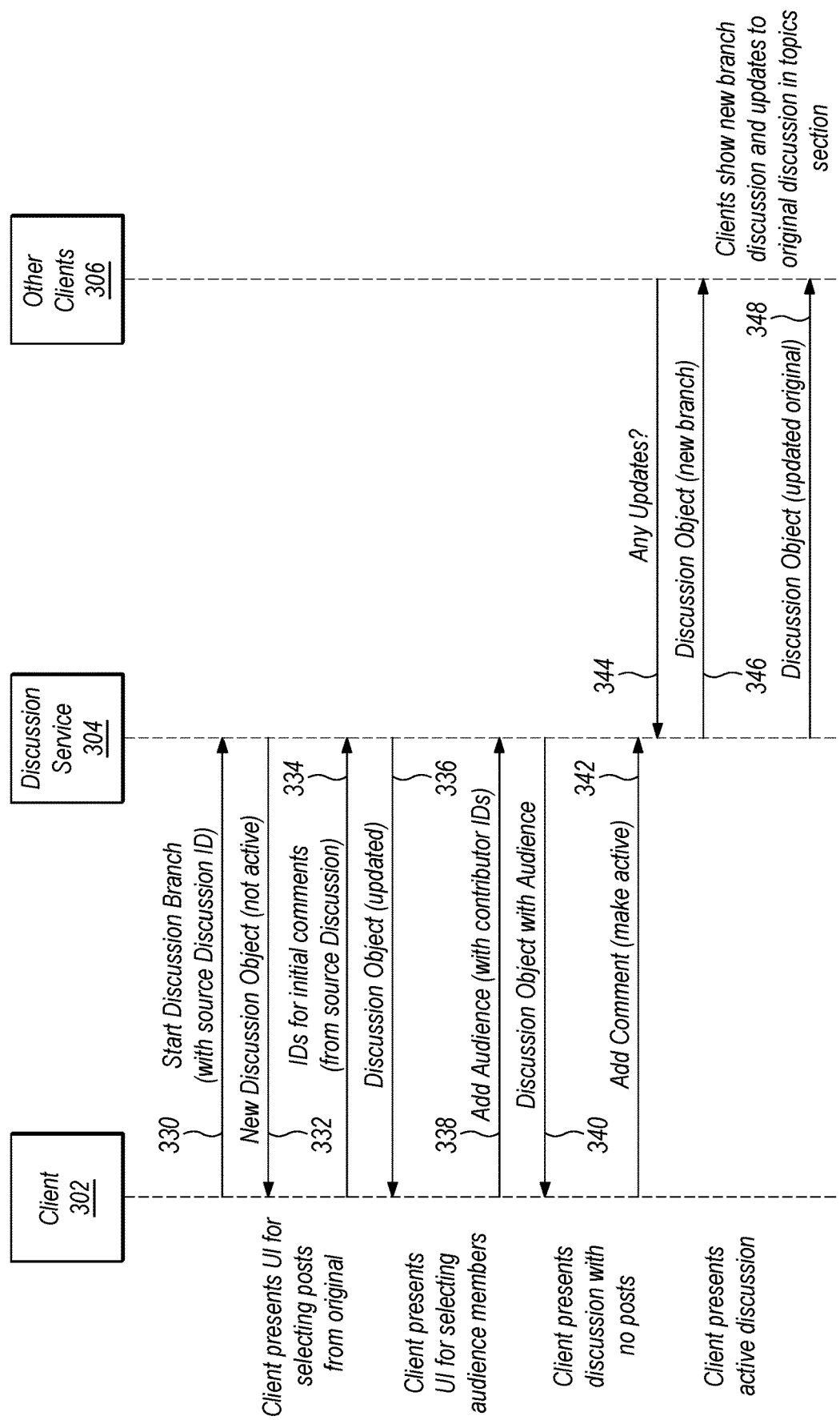
FIG. 10 illustrates message communication between server and user device during creation of a new branch discussion in accordance with an embodiment of the present invention.

FIG. 10 illustrates message communication between server and user device during creation of a new branch discussion in accordance with an embodiment of the present invention. FIG. 10 shows a client 302 that initiates creation of the new branch discussion, a discussion service 304 and other clients 306 that participate in the discussion. The clients 302, 306 can correspond to any of user devices 106, 108, 110, 112, 114, 116, shown in FIG. 1 while the discussion service 304 can correspond to any of servers 102, 104, shown in FIG. 1.

To create a new branch discussion, the client 302 sends a message 330 to the discussion service 304 that informs that service 304 that the client 302 wishes to branch an existing discussion. Included in the message 330 is an identification (discussion ID) of the existing discussion from which the user desires to create the branch. In response, the service 306 sends a message 332 to the client 302 that includes a new discussion data object. The new discussion data object represents the new branch discussion and is indicated as not active at this point. In response to receiving the new branch discussion data object, the client 302 presents the user with a user interface on a display screen of the user device that allows the user to select posts of the existing discussion to be included in the new branch discussion being created (as in FIG. 6). The client 302 then sends a message 334 to the service 304 that informs the service of the identifications of the selected posts by including their post identifications in the message 334. The service 304 responds by sending a message 336 to the client 302 that includes the discussion object which is now updated.

In response to receiving the updated discussion data object, the client 302 can present the user with a user interface on a display screen of the user device that allows the user to select participants for the new branch discussion being created. The client 302 then sends a message 338 to the service 304 that informs the service 304 of the identities of those selected participants by including the participant identifications in the message 338. The service 304 responds by sending a message 340 to the client 302 that includes the discussion object which is now updated to include identifications of the discussion participants. In an embodiment, a default set of participants is presented that matches the participants list from the original discussion; at any time a discussion moderator can edit this list, adding or removing people, groups or intersections.

The client 302 user interface displays the branch discussion and can now accept a first new post for the branch discussion. A message 342 is then sent to the service 304 that includes the first post. The branch discussion is now active.

Meanwhile, the service 304 responds to any request for updates message 344 received from a client 306 by sending a message 346 to the client 306 that includes the discussion object for the newly-created branch discussion. The service 304 can also send a message 348 to the client 306 that includes the discussion object for the original discussion from which the branch was created which is updated to reflect the branch creation. The client 306 presents the user with a user interface (e.g., as in FIG. 7) that shows the new branch discussion, and possibly also the original discussion, and that allows the user to participate in the branch discussion and possibly also the original discussion by reviewing posts and making new posts.

FIG. 11 illustrates database tables 350, 352 used by a server 102, 104 for storing discussion data, including branched discussions, in accordance with an embodiment of the present invention. The tables 350, 352, can be stored for example, in mass storage 136 (FIG. 2) of servers 102 or 104. Table 350 is a database table for discussions while table 352 is a database table for discussion comments. The table 350 can be arranged in three columns, including a discussion ID column 354, a discussion title column 356 and a discussion branch column 358. Each row of the table 350 corresponds to a unique discussion. In the discussion ID column 354, each row contains a unique identification assigned to the discussion for that row. The discussion title column 356 contains a title assigned to the discussion of that row. The discussion branch column 358 contains the identification of a discussion from which the discussion of that row is branched from, if any. For example, as shown in FIG. 11, a first discussion occupies the first row of the table 350 and is assigned identification "1" in column 354 and is titled "Original" in column 356. A second discussion occupies a second row in table 350 and is assigned identification "2" in column 354 and is titled "Branch #1" in column 356. The second discussion is branched from the first discussion; accordingly, the branch column 358 for the second discussion contains the identification of the first discussion. The first discussion is not branched from any other discussion; accordingly, the branch column 358 for the first discussion does not identify any other discussion (e.g., it is empty or contains a null value).

Information stored in the database tables 350, 352, for each post can include metadata, such as date, time and author, as well as gestures, such as likes and votes related to a post.

The comments table 352 can be arranged in four columns, including a comment ID column 360, a discussion ID column 362, a comment content column 364 and an original comment column 366. Each row of the comment table 352 corresponds to a unique comment contributed to a particular discussion contained in the discussion table 350. In the comment ID column 360, each row contains a unique identification assigned to the comment for that row. The discussion ID column 362 contains the identification of the discussion to which the comment of that row belongs. The comment content column 364 contains the text of the comment and possibly other information, for example, links to other information such as media files. A duplicate of comment ID column 366 contains the identification of a source post from when the branch was created.

For example, as shown in FIG. 11, a first comment occupies the first row of the table 352 and is assigned identification "1" in column 360. Second and third comments occupy the second and third rows of the table, respectively, and are assigned comment identifications "2" and "3" in column 360. These three comments (with identifications 1, 2, and 3) are part of discussion ID=1, as indicated by the "1" in column 362 for their rows in table 352. As also shown in table 352, fourth and fifth comments occupy the fourth and fifth rows of the table 352, respectively, and are assigned comment identifications "4" and "5" in column 360. These two comments (with identifications 4 and 5) are part of discussion ID=2, as indicated by the "2" in column 362 for their rows in table 352. Comment with comment ID=4 is a duplicate of the comment having comment ID=1, as shown by the "1" in column 366 for comment ID=4. Similarly, comment with comment ID=5 is a duplicate of the comment having comment ID=3, as shown by the "3" in column 366 for comment ID=5. Thus, these comments are contained in a discussion branch but are duplicates of comments of the original discussion.

Figure 12:
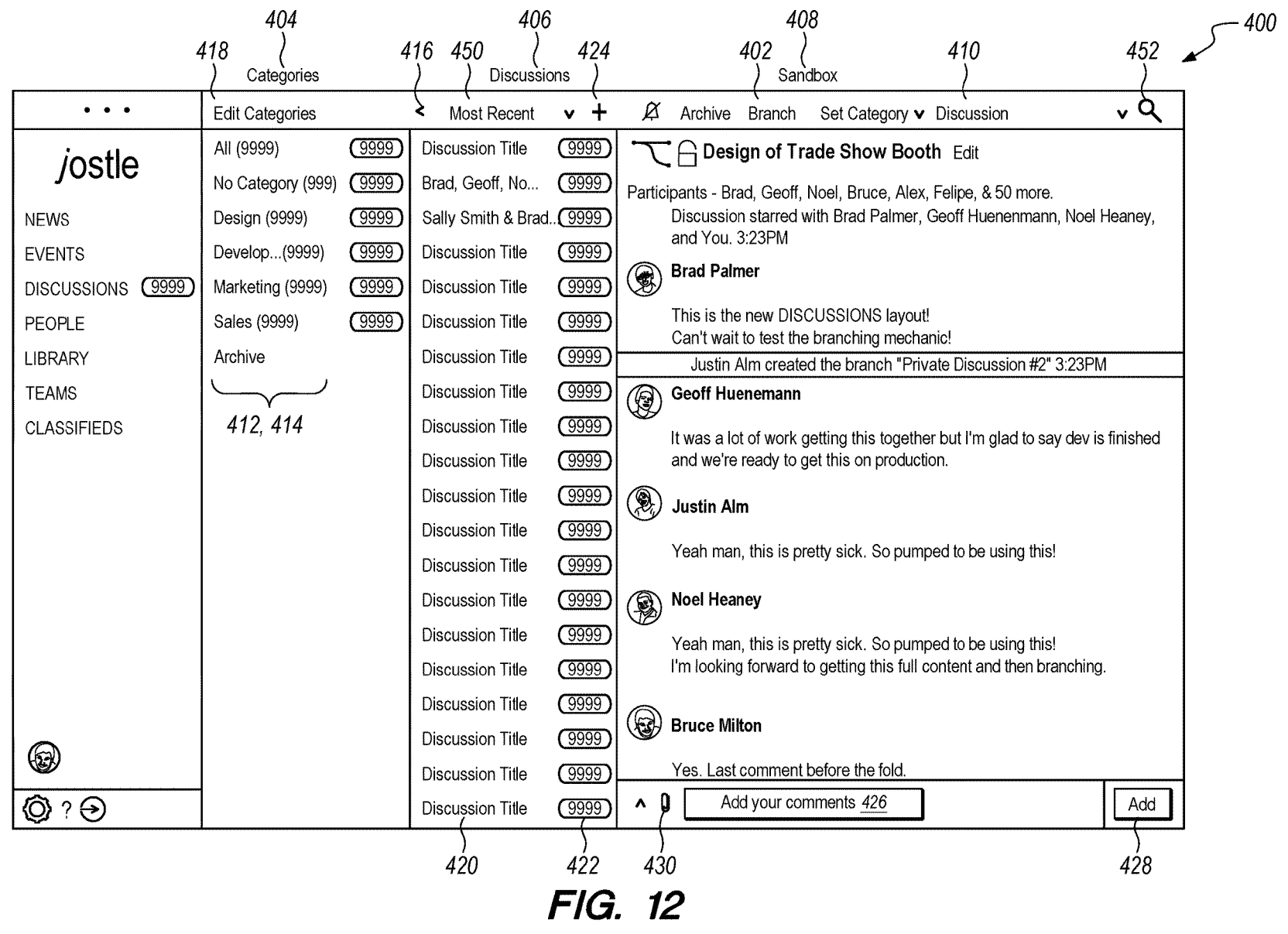

FIG. 12 illustrates a user interface 400 for display of discussion content having three information content columns in accordance with an embodiment of the present invention. The user interface of FIG. 12 is similar to that shown in FIG. 5 with some differences. The interface 400 includes a branch control button 402, a discussion categories column 404, a discussions column 406 and a comment workspace area or "sandbox" 408.

The user interface 400 is illustrated in FIG. 12 in the "Discussions" view mode. Upon selection via a drop-down menu 410, the "Discussions" view shows the three columns. The first column 404 entitled "Categories" contains a vertical list of all the discussion categories found within the "Discussions" view. Some categories are non-editable and other categories are user-defined. By default, the only user-defined category is entitled "My category." Preferably, the categories of "All", "No Category", and "Archive" are non-editable. This means that their positions are persistent in the user interface 400 and they cannot be renamed.

The category "All" contains titles of discussions being followed by a particular user upon whose device the interface 400 is displayed. When the "All" category is selected, these discussion titles will load into the "Discussions" column 406. "All" is useful to display discussions across all categories, excluding the "Archive" category. In a preferred embodiment, only moderators can archive a discussion, in which case, the discussion then appears in the Archive folder for all participants of the discussion.

The category "No Category" includes all of the discussions that the user has not moved into a unique category. User-defined categories preferably appear between the "No Category" and "Archive" categories. The category "Archive" contains discussions the user has chosen to archive.

As shown in FIG. 12, each row in the "Categories" column 404 preferably includes a category title 412 and a number 414 of discussions in the category. The number 414 of discussions in the category is displayed in parentheses adjacent to the category title 412. In an embodiment, the category names are truncated to twelve characters minus the characters representing the number of discussions in the category. The full category name can be displayed by hovering a cursor over the category, e.g. for one second. A notification badge (shown as a number in an oval to the right of the number in the parentheses) can be displayed adjacent to the number of discussions in the category which indicates the number of new comments posted within the category since the last time the user viewed discussions within the category.

In an embodiment, the categories column 404 can be collapsed. Hiding the category column 404 frees up horizontal space in the user interface 400. To collapse the category column 404, the user can select (e.g., click on) the collapse icon (i.e. "<") 416 on the left-hand side of the discussions column 406. In this case, the discussions column 406 will slide over the category column 404 and hide it out of view. The title of the selected category will then preferably be displayed in the top two rows of the discussion column 406. A downward pointing icon (i.e. "\/") can then be displayed in the top cells to indicate the element is a drop down menu for selecting a different category to load into the discussions column 406. To open (un-collapse) the categories column 404 again, the user can click an un-collapse icon (i.e. ">") which will then be displayed on the right-hand side of the discussions column 406.

Figure 13:
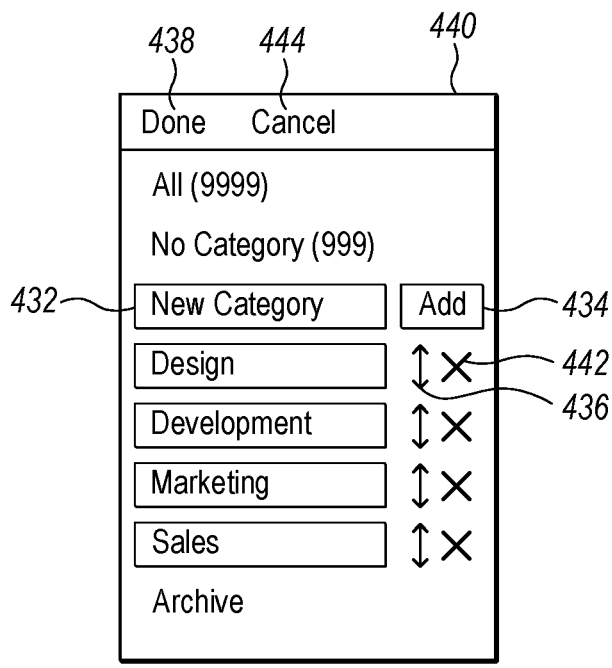
FIG. 13 illustrates a user interface for editing a discussion categories column in accordance with an embodiment of the present invention.

To edit the discussion categories, the user can select (e.g. click on) an "Edit Categories" button 418 shown in FIG. 12 at the top of the categories column 404. FIG. 13 illustrates a user interface for editing the categories column 404 (FIG. 12) in accordance with an embodiment of the present invention. Using the interface, the user can add, delete, and reorder the user-defined categories. After selecting the "Edit Categories" button 418 (FIG. 12), the categories column 404 changes into an edit mode as shown in FIG. 13. In this mode, category names become editable text inputs for renaming the categories. "All", "No Category", and "Archive" are non-editable categories and, therefore, they preferably change into a disabled state. Below "No Category" appears a "New Category" input field 432. An "Add" button 434 is preferably disabled until at least one character has been entered into the "New Category" field 432. The "Add" button 434 then changes from its disabled state to enabled after at least one character has been input into the field 432. To reorder categories, the user can click-and-hold a reorder icon 436 beside the category name. The order is preserved after the user selects a "Done" button 438 in the action bar 440.

To delete a category, the user selects a "Delete" icon 442 adjacent to the reorder icon 436. When the user is finished editing categories, the user can select the "Done" button 438 to save the changes or a "Cancel" button 444 in the action bar 440.

Figure 14:
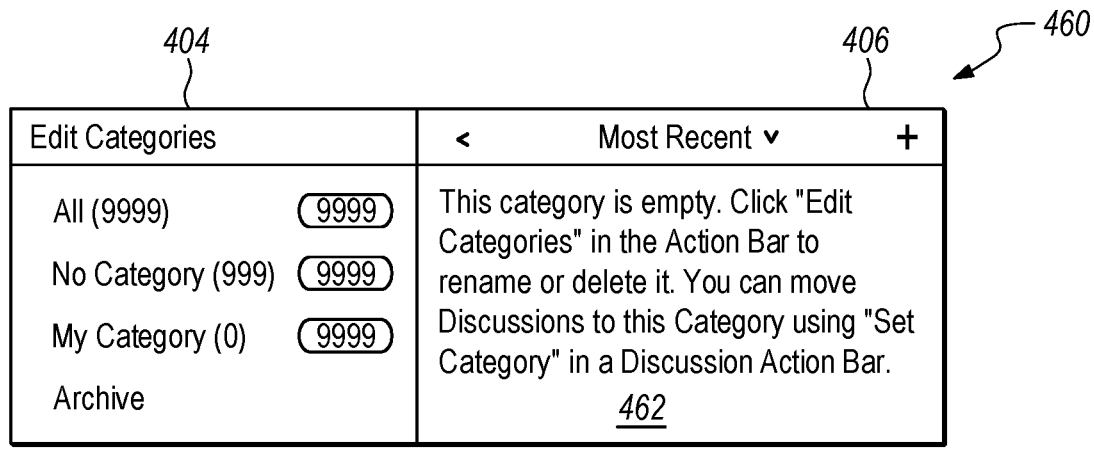
FIG. 14 illustrates a user interface for editing a newly-created empty discussion category in accordance with an embodiment of the present invention.

FIG. 14 illustrates a user interface 460 for editing a newly-created empty discussion category in accordance with an embodiment of the present invention. If a category is new, help text 462 is preferably displayed in the discussions column 406. The help text can read as follows: "This category is empty. Click "Edit Categories" in the Action Bar to rename or delete it. You can move Discussions to this Category using "Set Category" in a Discussion Action Bar."

With reference again to FIG. 12, each row in the discussions column 406 can have a discussion title 420 and a notification badge 422. The discussion titles 420 can preferably have longer character counts than the category titles. The discussion titles preferably truncate at 22 characters when the categories column 404 is open. When the categories column 404 is collapsed, discussion titles will preferably truncate at 30 characters. A full discussion title can be viewed by the user hovering a cursor over the discussion title, e.g., for one second. The notification badges 422 can show the number of new comments that have been published in a discussion since the user last viewed comments of the discussion.

Figure 15:
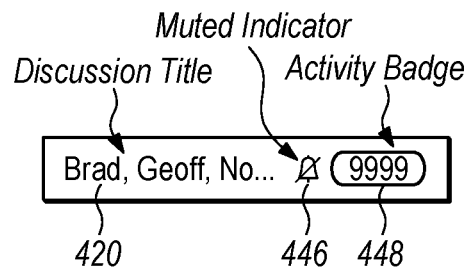
FIG. 15 illustrates information displayed for a discussion in accordance with an embodiment of the present invention.

FIG. 15 illustrates information displayed for a particular discussion in the discussions column 406 in accordance with an embodiment of the present invention. Settings dependent elements that can appear next to the discussion titles 420 include a "muted" indicator 446 which appears if the user has "muted" the discussion. If a user mutes a discussion, the user does not receive notifications of updates to the discussion (e.g., new posts); otherwise, if the discussion is not muted, the user does receive notifications. When the particular discussion is selected, a grey activity badge 448 can be used to indicate a number of posts added to the discussion since the user's last viewing. When the discussion is selected, the discussion title 420 can preferably be displayed in user-selected color (e.g. orange) that is different from the color used to display titles of discussions that are not the currently-selected one.

Figure 16:
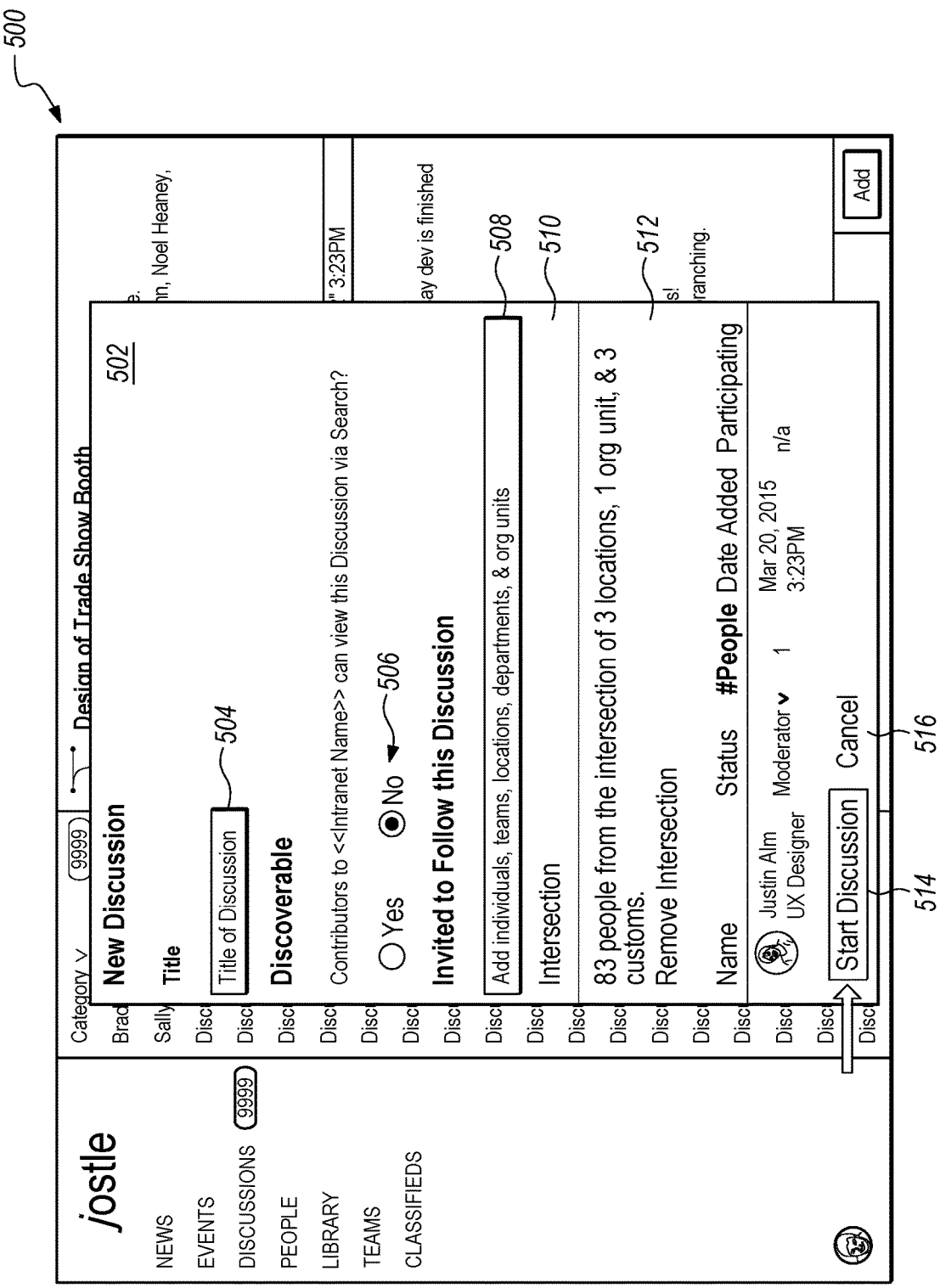
FIG. 16 illustrates a user interface for a newly-created discussion in accordance with an embodiment of the present invention.

FIG. 16 illustrates a user interface 500 for a newly-created discussion in accordance with an embodiment of the present invention. When the user hovers over a "+" icon 424 (FIG. 12) in the action bar at the top of the discussions column 406, a text message will preferably appear showing a message: "Click here to start a new Discussion." To create a new discussion, the user then selects (e.g. clicks on) the icon 424. In response, a new discussion modal window 502 can appear over a sheet of translucent layer of black.

The new discussion modal window 502 can include a text input field 504 for the discussion title. As shown in FIG. 16, placeholder text in the field 504 shows the message: "Title of Discussion." Radio buttons 506 having "yes" and "no" selection options can be used to determine whether the discussion is discoverable by other users within a specified network domain. As shown in FIG. 16, a label "Discoverable" appears adjacent to the radio buttons 506. Additional text appearing beneath the "Discoverable" text reads, "Contributors to <<Intranet Name>> can view this Discussion via Search?" where "Intranet Name" is replaced with a name assigned to the particular network domain which can be a true network domain name or, more generally, a name assigned to an organization's intranet. In an embodiment, the radio selection defaults to no selection so the user must decide whether the discussion is discoverable before proceeding.

An input field 508, entitled "Invited to Follow this Discussion" in FIG. 16 allows the user to invite individuals, teams, locations, departments, and organizational units to participate in the discussion. Thus, participants can be identified, not only as individuals, but by their roles or membership in groups within an organization. An input field 510 allows the user to identify additional participants as those who are within an intersection of subgroups of the user's organization, e.g., an intersection of a location, organizational unit, and one of a user-defined subgroup. A field 512 can be used to show the individual participants that have been selected in fields 508 and 510. After configuring the form 502, the user can select (e.g. click on) a "Start Discussion" button 514 at the bottom of the modal window 502 or a "Cancel" button 516 to exit the window 502 without starting the new discussion. In a preferred embodiment for a branch discussion, these visibility settings default to those of the originating discussion though a moderator can then make changes to the default settings.

Figure 17:
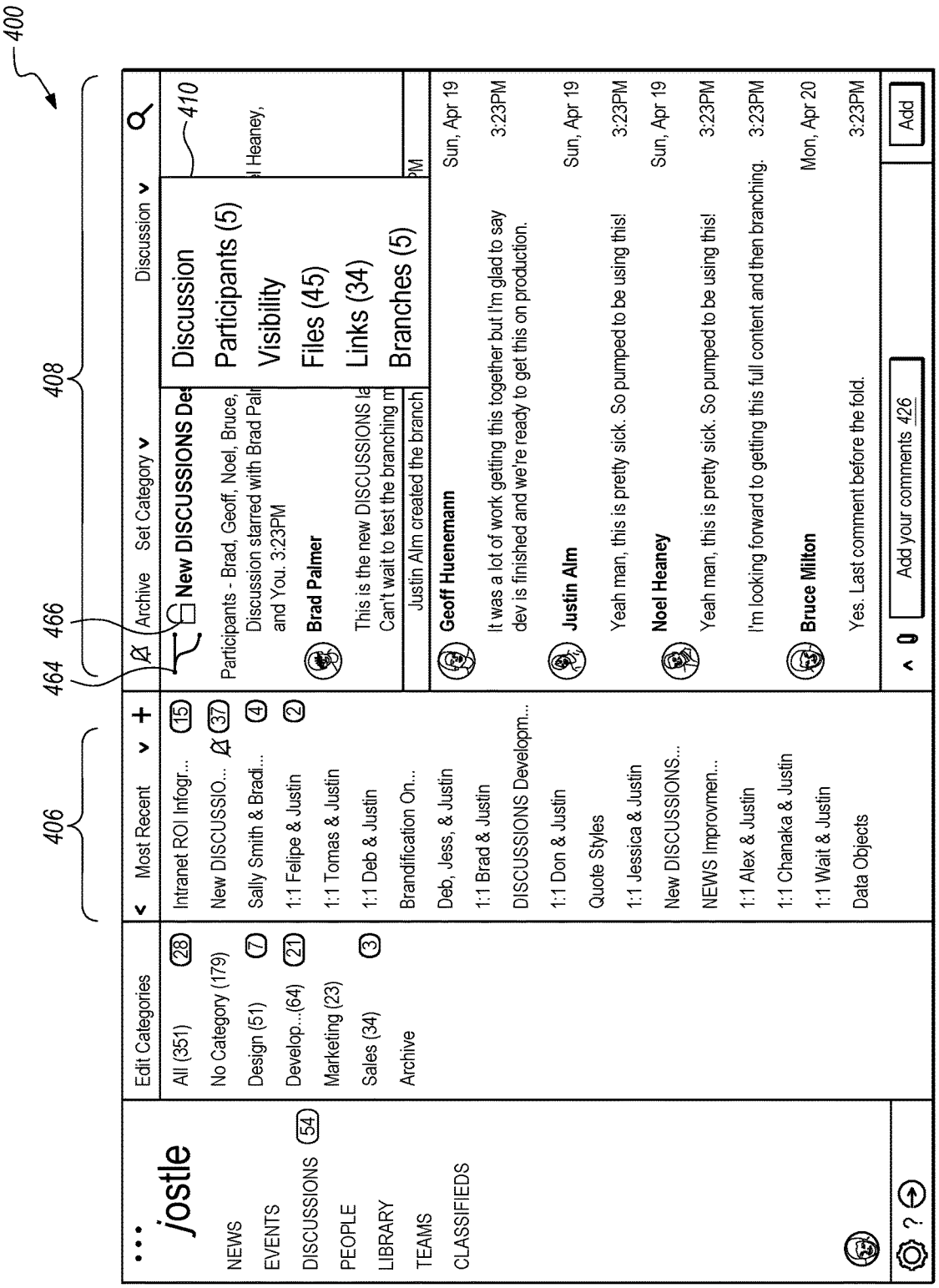
FIG. 17 illustrates a user interface for selection of a view mode of a discussion sandbox in accordance with an embodiment of the present invention.

FIG. 17 illustrates the user interface 400 of FIG. 12 showing selection of the "Discussion" view mode of the discussion sandbox in accordance with an embodiment of the present invention. As shown in FIG. 17, the "Discussion" view mode is selected via the drop-down menu 410. Other selections shown in the menu 410 and discussed herein include the modes, "Participants," "Visibility," "Files," "Links," and "Branches."

The "Discussion" view mode is preferably selected by default when a discussion is selected in the discussion column 406. In this view, an ascending chronological list of comments (i.e. posts) published by participants of the selected discussion are displayed in the sandbox 408. The most recent comment therefore preferably appears at the bottom of the list. A "Branch" Icon 464 appears adjacent to the title of a branched discussion. On hovering a cursor over the icon 464, a message can appear that identifies the discussion from which the discussion was branched. For example, the message can be as follows: "This Discussion is a Branch of <<Origin Discussion>>."

If a particular discussion is not discoverable (the "Discoverable" setting is set to "No"), a lock icon 466 can appear as closed adjacent to the discussion title. On hover, a message will preferably appear with the text, "Private—Only those invited by a Moderator can see this." If the particular discussion is discoverable (the "Discoverable" setting is set to "Yes"), a lock icon 466 can appear as open, as shown in FIG. 17. On hover, a message will preferably appear with the text, "Discoverable—Anyone can find this Discussion via search and view it" or similar.

Discussion titles can include the first names of two contributors if there are only two contributors to the discussion. For example, the discussion title at the top of the "Discussion" view can be, "1:1 Brad & Justin". In an embodiment, this happens automatically in the case where a user hovers over the avatar (i.e. photo) of a person displayed anywhere in the system and selects "Start Discussion." Such 1:1 discussions can be initiated in other ways such as by accessing the person's profile or name and right-clicking anywhere in the profile or one the person's name. This places the participants immediately into an active 1:1 discussion without having to first set anything up. If a 1:1 discussion already exists for these same participants, the user is preferably given the option to go there and resume the existing 1:1 discussion. Alternatively, the user can selectively create a new ad hoc 1:1 discussion and give the discussion a different title. This functionality advantageously combines the advantages of 1:1 real time chat, with team-based forum-like discussions in the same tool.

In an embodiment, each user may be provided with a 1:1 discussion category (e.g. entitled "1:1 Discussions") in the category column 404 of their user interface that is automatically populated with 1:1 discussions in which the user is a participant.

Discussions other than 1:1 discussions (having more than two participants) are preferably required to be given a title during creation of the discussion. In this case, the first names of the last 7 people who have participated in the discussion are preferably listed adjacent to the title of the discussion. If more than 7 people have been added to the discussion, a link with the total number of people added to the discussion, minus 7, preferably appear at the end of the list of names. The participant names are preferably links to profiles of the individual participants. The last item in this list, "<<#>> More" can be a link to the "Participants" view of the discussion sandbox 408. This is viewable under the title in FIG. 18.

Referring to FIG. 12, a participant can publish a comment to a discussion using a comment input field 426. The comment input field can include placeholder text: "Add your comments." The participant can enter text and/or attach a file using the comment input field 426. When the participant is finished writing a comment or attaching a file in the comment input field 426, you can select (e.g. click on) an "Add" button 428 adjacent to the text input field 426. The "Add" button 428 is in a disabled state until at least one character is input into the text field or a file is attached. In an embodiment, when a user clicks into the comment input field, it extends in height until a predetermined number of lines (e.g., five) have been reached. After five lines of content have been input, the field scroll is enabled. Basic text-editor controls will preferably appear above the field 426 during text entry. The controls can include: press enter to add, bold text, italicize text, format text as unordered list (bullets), indent text, and remove formatting.

To attach a file, the user can a select a paperclip icon 430 which then opens a window that allows the user to select a file to attach. In addition to the paperclip attach mechanism, the user can preferably drag and drop files onto the comment input field 426.

FIG. 18 illustrates the user interface 400 of FIG. 12 with the "Participants" view mode of the discussion sandbox selected in accordance with an embodiment of the present invention. As shown in FIG. 18, the "Participants" view mode is selected via the drop-down menu 410. In this view mode, a table of people and groups who have participated in the discussion is displayed. Each row in the table preferably identifies a contributor participating in the discussion. The table that is preferably sortable using table headers: "Name," "Status" (which can be, for example, "Moderator," "Invitee," or "Follower"), "Location," "Last Post" (which can show, for example, the time and date of the last post), and "Number of Posts in this Discussion."

FIG. 19 illustrates the user interface 400 of FIG. 12 with the "Files" view mode of the discussion sandbox selected in accordance with an embodiment of the present invention. As shown in FIG. 19, the "Files" view mode is selected via the drop-down menu 410. In this view mode, a table of files that have been shared in discussion comments is provided. The table can include thumbnail preview of each file, a file name, a link to view the file, a link to download the file and a link to view the file in the context of the discussion in which the file is referenced. This table can preferably be sorted using table headers: "Files", "Uploaded" (the date the file was shared), "Type" (type of the file), "Size" (file size in KB, MB, GB), "Number of Views" (the number of times the file has been opened), "Downloads" (the number of times the file has been downloaded), and "Via" (the identification of the participant that shared the file in this discussion). In an embodiment, users can make specific attachments personal favorites, which get marked and become sortable. Additionally, moderators can create favorites that everyone viewing the discussion can see.

FIG. 20 illustrates the user interface 400 of FIG. 12 with the "Links" view mode of the discussion sandbox selected in accordance with an embodiment of the present invention. As shown in FIG. 20, the "Links" view mode is selected via the drop-down menu 410. In this view mode, a list of links shared in the discussion is displayed. These can be the links that users have embedded in the text of posts in the Discussion, arranged in chronologic posting order. The links can include URL's to web pages on the Internet as well as links shared to other discussions and comments from within the system. This table is preferably sortable via table headers: "Links", "Favorites" (the user can click on a displayed star to favorite a link and then the table can be sorted so that favorites appear at the top of the list), "Type" (e.g. post, URL, Google doc, etc.), "Date" (the date the link was shared), and "Via" (the identification of the participant that shared the link in this discussion). In an embodiment, if a user clicks on a link to a comment or discussion that the user does not have permission to view, a message will appear informing user that the discussion is "private" and that the user can contact one of the discussion moderators to be granted access to the discussion. Links can have the favorites functionality as described above with respect to attachments.

Figure 21:
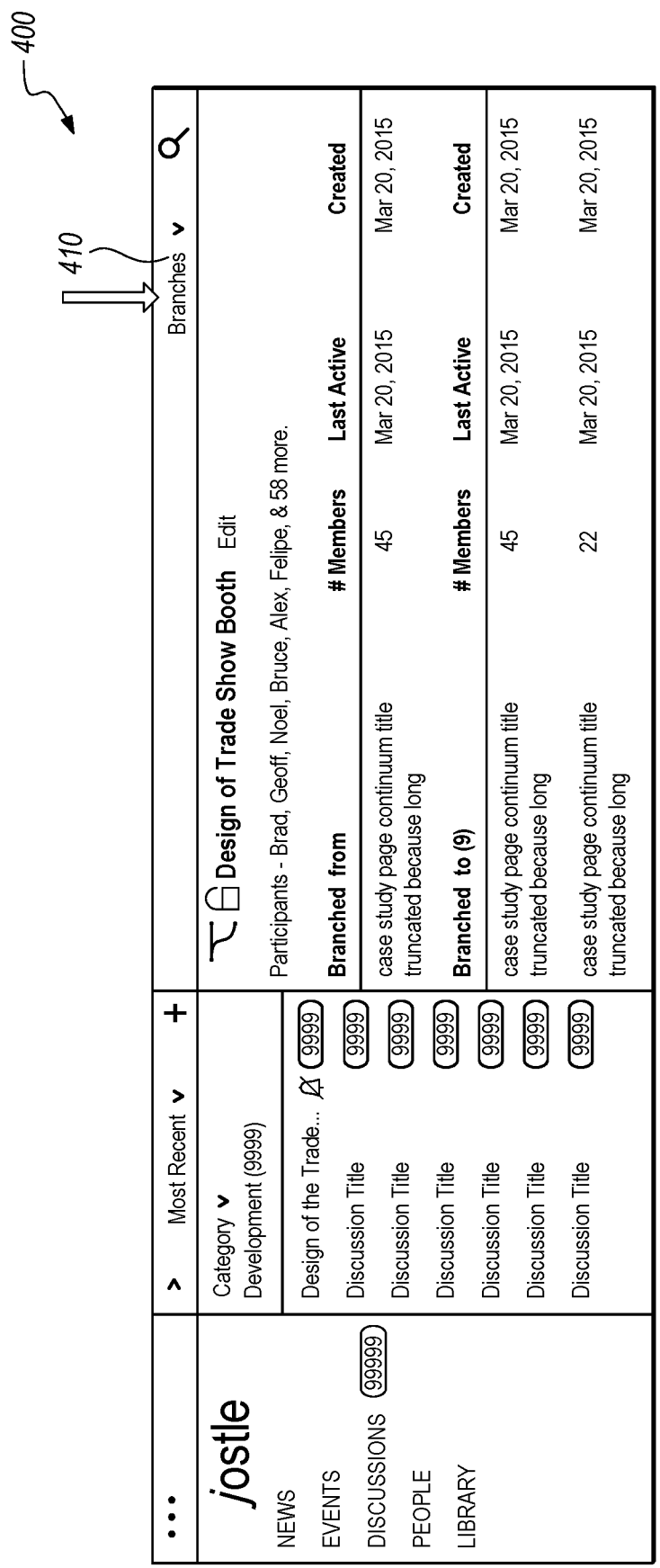
FIG. 21 illustrates a user interface for a "Branches" view mode of a discussion sandbox in accordance with an embodiment of the present invention.

FIG. 21 illustrates the user interface 400 of FIG. 12 with the "Branches" view mode of the discussion sandbox selected in accordance with an embodiment of the present invention. As shown in FIG. 21, the "Branches" view mode is selected via the drop-down menu 410. "Branches" in the view mode dropdown 410 is available after a discussion has been branched. In this view, branches of the presently-selected discussion are displayed in a table. If the current discussion was created via a branch, a "Branched from" table will appear at the top of the view that identifies the original discussion from which the current discussion was branched. If the current discussion is not a branch, this "Branched from" table will not be displayed. Below the "Branched from" table (if applicable) is a list of "Branched to" discussions that identified discussions have been branched from the currently-selected discussion. Discussion titles identified as "Branched from" or "Branched to" preferably function as links to those discussions. This table is preferably sortable via the following table headers: "Branched from," "Branched to," "Number of Members in the Discussion," "Last Active" (the date the most recent post to the discussion was made) and "Created" (the date the discussion was created).

FIG. 22 illustrates the user interface 400 of FIG. 12 with the "Visibility" view mode of the discussion sandbox selected in accordance with an embodiment of the present invention. As shown in FIG. 22, the "Visibility" view mode is selected via the drop-down menu 410. This view mode displays a list of users that have permission to view the currently-selected discussion. For discussion moderators, the "Visibility" view mode is editable to change permissions.

Figure 23:
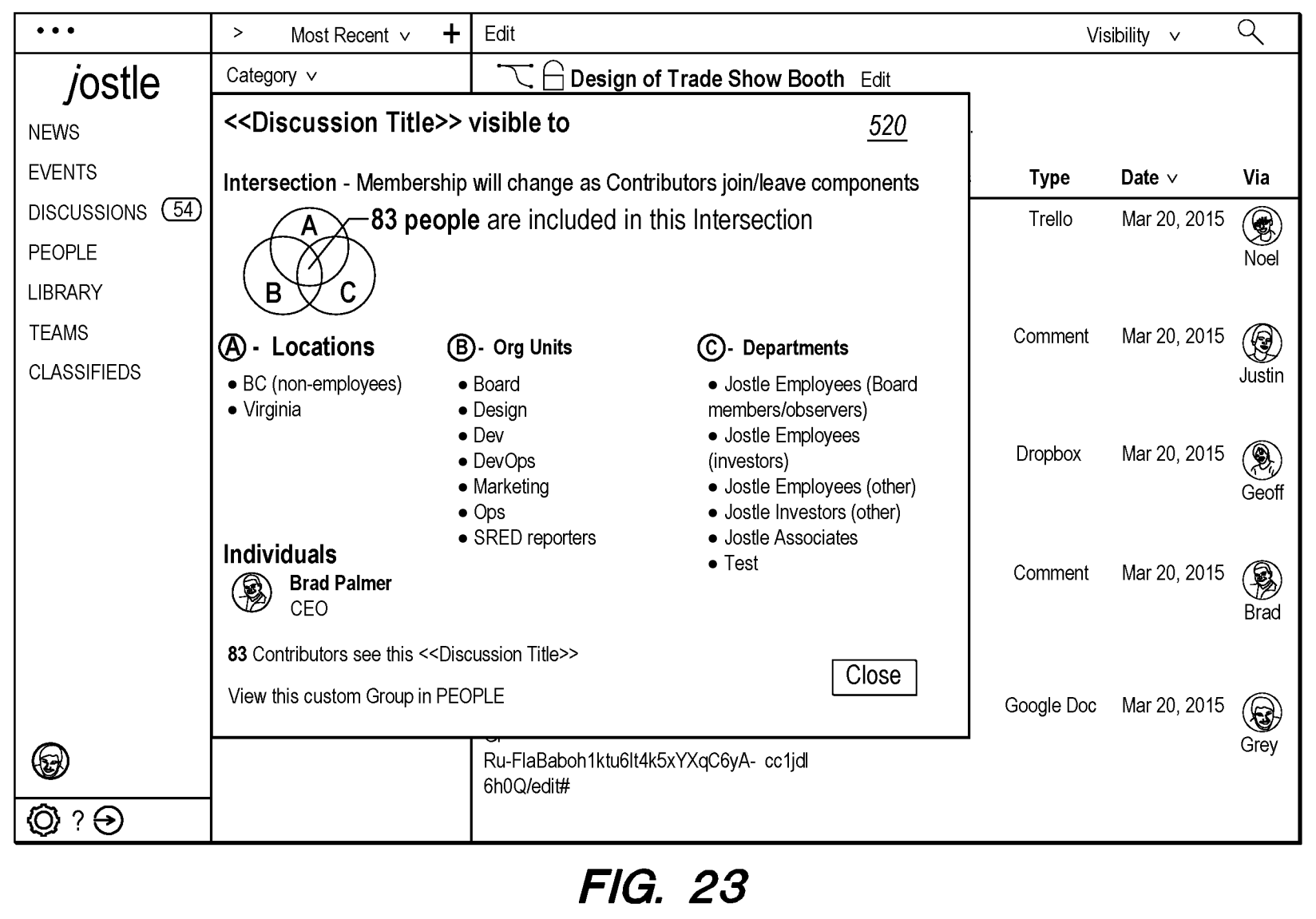

Referring again to FIG. 16, it shows an input field 510 that allows the user to identify additional participants by their roles or membership in groups within an organization and, more specifically, by an intersection of subgroups of the user's organization. FIG. 23 illustrates a modal window 520 for displaying an intersection of subgroups accordance with an embodiment of the present invention. The model window 520 can be accessed from the "Visibility" view mode selection, shown in FIG. 22. If an intersection is defined, an "info" icon 522 will appear at the end of the summary of that intersection (FIG. 22). Selecting the icon 522 (e.g. clicking on it) displays the modal window 520. The window 520 displays details regarding the intersection, including the specific locations, organizational units, and departments for the intersection.

In an embodiment, the user has the ability to make a discussion visible to "everyone" (all users within the intranet domain), a predefined group of users, or a custom group of users. The user also has an ability to add an intersection to the top of an additive list of user to whom the discussion is visible. The interface preferably also provides an indication of the number of people to whom the discussion is visible. The user can preferably also save a custom group to whom the user is making content visible to so that the user can reuse the custom group when starting new discussion or publishing any kind of content on the intranet.

In an embodiment, there are three different statuses a user can have with respect to a particular discussion: "moderator," "invitee," and "follower." A moderator can be a user who created the discussion or a person otherwise appointed and identified as a moderator, whereas, invitees are users that a moderator has invited to join the discussion. The privileges of an invitee preferably include the ability to: (1) move the discussion to their own user-defined category; (2) export the discussion; (3) archive the discussion (though in an embodiment, this privilege is reserved for moderators); (4) mute notifications for the discussion; and (5) email moderators of the discussion. Moderators preferably have all the privileges of an invitee plus the ability to: (1) edit the discussion title; (2) change the discussion's visibility settings; (3) add/remove invitees from a discussion; (4) promote an invitee to moderator; (5) demote a user from moderator to invitee; (6) delete posts made by participants of a discussion (though participants can preferably delete their own posts); and (7) delete the discussion from archive. Once archived, a user can potentially permanently delete a discussion. Once a discussion is permanently deleted, it is no longer accessible any user. Preferably, a discussion can only be deleted by one of its moderators. An invitee becomes a participant in a discussion after having contributed at least one post to the discussion. Participants can have the same privileges as invitees, but with the ability to delete their own posts. A follower can be a user that has found the discussion via search, has not been invited by a moderator, and has not published a comment in the discussion. A follower's privileges preferably include the ability to: (1) view (i.e. read only) comments, participants, files, links, branches, and visibility of the discussion; and (2) email moderators of the discussion.

FIG. 24 illustrates how a discoverability setting for a discussion affects its visibility to users in accordance with an embodiment of the present invention. As shown in FIG. 24, users are divided into two groups with respect to a particular discussion: (1) invitees; and (2) all other users. If the discussion is designated as private (i.e. not discoverable), then the discussion is not discoverable by searching and is not viewable, except by invitees. FIG. 24 also shows that if the discussion is designated as discoverable (i.e. not private), the discussion is searchable, and its posts can be viewed by, users who are not invitees. Users who are invitees can view the discussion posts and participate in the discussion; this is true regardless of whether the discussion is private or discoverable.

Figure 25:
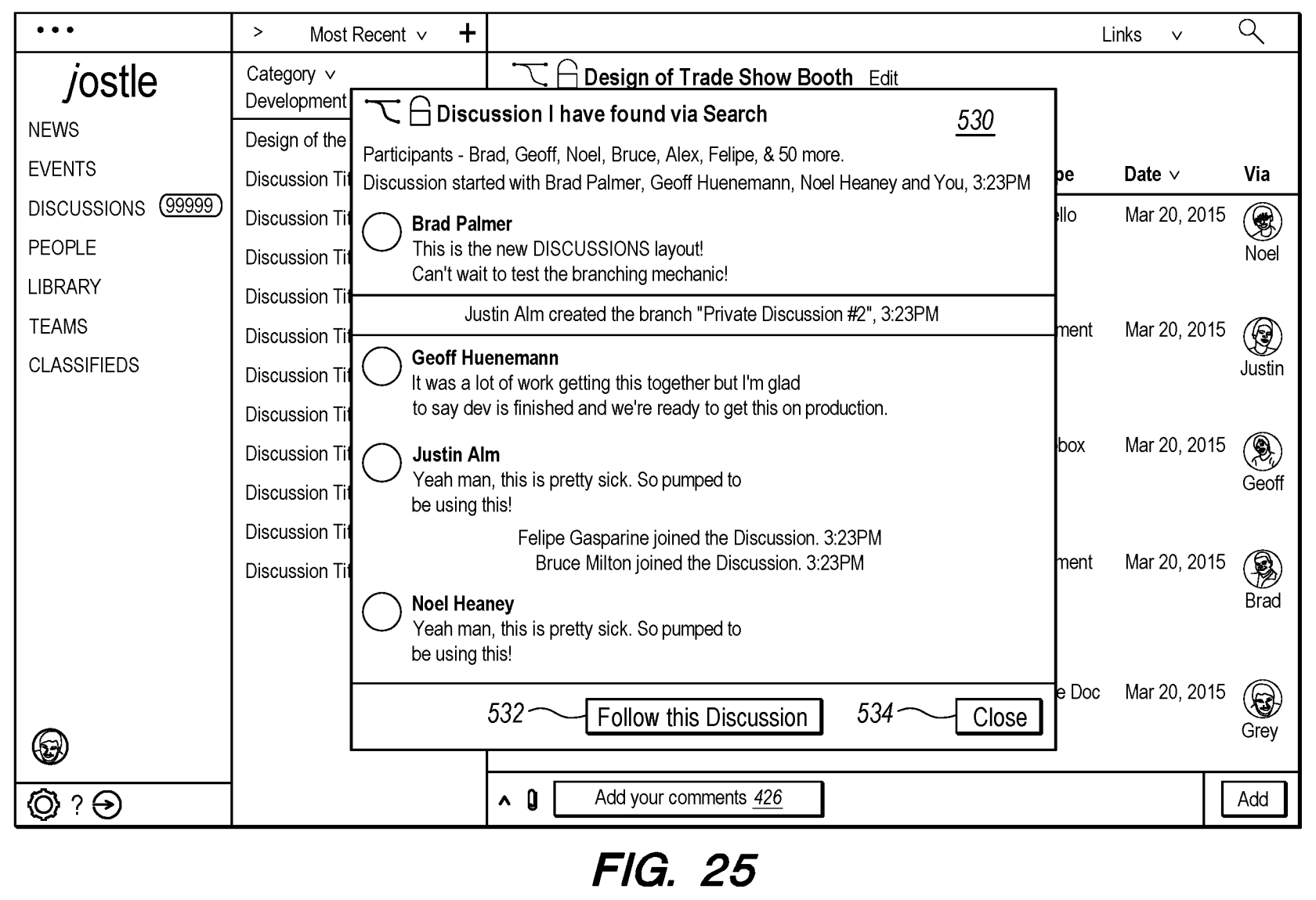

A user can search discussions by selecting a "search" icon 452 (FIG. 12) and entering one or more keywords. The user can then select a particular discussion from a list of discussions found. In an embodiment, the user is presented with a list of search results in a dropdown menu while the user types the one or more keywords; a table of complete results of the search can then be displayed along with associated, sortable metadata once the user presses an enter button. FIG. 25 illustrates a modal window 530 showing a discussion accessed via a search in accordance with an embodiment of the present invention. The modal window 530 appears after the user selects a particular discussion from among the search results. To become a follower of the discussion accessed via a search, the user can select a "Follow this Discussion" button 532. After selecting (e.g., by clicking on it) the button 532, the discussion is added to the user's "No Category" category. Alternatively, the user can close the window 534 without following the discussion by selecting a "close" button 534.

Avatars for users preferably appear adjacent to posts. For each post, an avatar of the user who published the post is preferably displayed. FIG. 26 illustrates displayed information of a contributor, including a contributor avatar 540 in accordance with an embodiment of the present invention. When a user hovers a cursor over an avatar, a modal window 542 will preferably open. Items included in the window 542 can include the contributor's name 544 and the contributor's primary role 546 in the organization. Indicators 548 can also appear that identify the contributor as an external contributor, a custom contributor identification that can show any attribute of the user, such as a skill qualification level or type of employee, and that inform the user whether the contributor is online and, if so, the contributor's location (e.g., by city).

The user can select: a view profile button 550; a go to 1-on-1 discussion button 552 (if 1:1 discussion already exists or to start a new discussion); a start Google Hangout button 554; a send email button 556; and a recognize via shout-out button 558.

Referring to FIG. 12, it shows the branch button 402 in the action bar above the sandbox 408 in "Discussion" view. Upon selection of the branch button 402, the comment input field 426 displayed in the sandbox 408 can be replaced with the create branch input field. FIG. 27 illustrates a create branch input field 560 and create branch button 562 for creation of a branch discussion in accordance with an embodiment of the present invention. The create branch input field 560 can display placeholder text: "New Branch Title." To create the branch, the user enters a title for the branch. The create branch button 562 then changes to an active state. The user then selects the "create branch" button to create the branch from the currently-selected discussion.

Figure 28:
FIG. 28 illustrates a newly-created branch discussion in accordance with an embodiment of the present invention.

FIG. 28 illustrates a newly-created branch discussion in accordance with an embodiment of the present invention. The branch is preferably created in the same category as the discussion it was created from. If the discussions titles column 406 has been sorted to most recent activity, the new branch title appears at the top of the discussions column 406. The new branch preferably opens in the sandbox 408 upon its creation with new comments loaded into the discussion view mode of the sandbox 408. The visibility settings of the branch can be the same as the original discussion from which it was branched from. FIG. 29 illustrates a branches view mode for the newly-created branch discussion in accordance with an embodiment of the present invention. As shown in FIG. 29, the newly-branched discussion is shown in relation to the original discussion.

Figure 30:
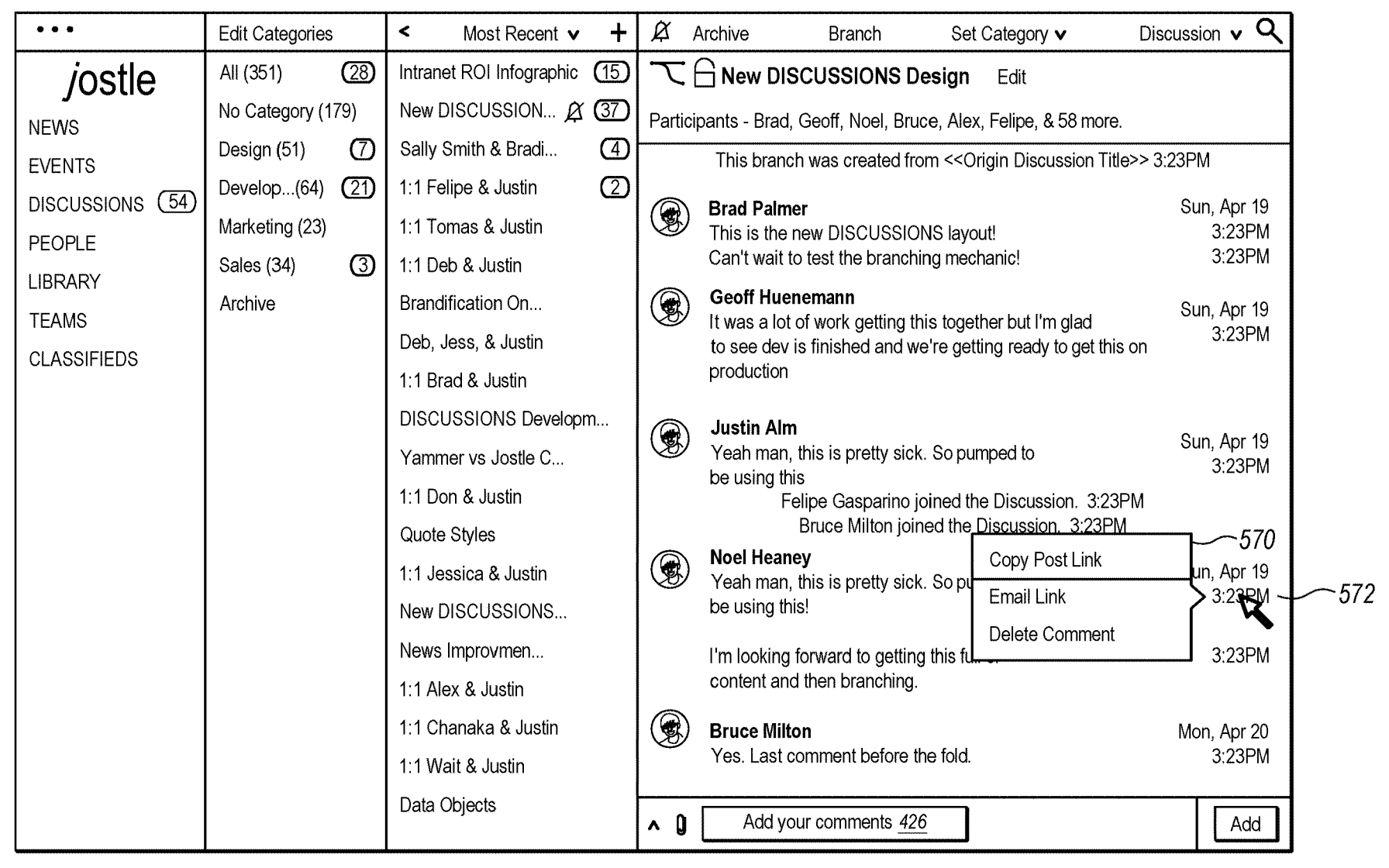

FIG. 30 illustrates a user interface menu 570 for copying a link to a post, emailing a link to a post (a "bookmark" link) or deleting a post in accordance with an embodiment of the present invention. The menu 570 is preferably accessed by clicking on or hovering over a timestamp 572 associated with the post.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of managing and displaying discussion content in a collaborative data processing environment, comprising steps of:

displaying posts of discussion participants within a user interface displayed on a display screen of a plurality of discussion participant user devices, the user devices being communicatively connected to a server wherein the server communicates an original discussion data object to the user devices, the original discussion data object representing an original discussion that includes the posts of the discussion participants;

accepting an instruction at a particular one of the user devices to create a branch of the original discussion and communicating an identification of one or more posts of the original discussion to be included in the branch discussion to the server from the particular one of the user devices;

assigning a unique identification to the branch discussion that is different from that of the original discussion and associating the one or more identified posts of the original discussion with the unique identification of the branch discussion;

displaying the branch discussion and the one or more identified posts of the original discussion on the display screen of the particular one of the user devices along with a selectable link to the original discussion, wherein said communicating the identification of one or more posts of the original discussion is performed prior to said displaying the branch discussion;

communicating a branch discussion data object for the branch discussion from the server to one or more of the plurality of discussion participant user devices; and receiving a new post for the branch discussion from one or more of the plurality of discussion participant user devices and associating the new post with the unique identification of only the branch discussion.

2. The method according to claim 1, wherein said displaying the posts of participants of the original discussion further comprises displaying a title assigned to the original discussion within the user interface.

3. The method according to claim 1, wherein said displaying the branch discussion further comprises displaying a title assigned to the original discussion within the user interface.

4. The method according to claim 3, wherein displaying the title assigned to the original discussion comprises a link for accessing the original discussion.

5. The method according to claim 1, further comprising displaying the title assigned to the branch discussion, wherein the title assigned to the branch discussion comprises a link for accessing the branched discussion.

6. The method according to claim 1, further comprising the particular one of the user devices communicating an identification of one or more selected participants for the created branch discussion.

7. A method of managing and displaying discussion content in a collaborative data processing environment, comprising steps of:

communicating an original discussion data object from a server to a plurality of user devices communicatively connected to the server, the original discussion data object representing an original discussion that includes posts of discussion participants of the original discussion and the user devices being configured to display the posts within a user interface displayed on a display screen of the user devices;

receiving at the server an instruction from a particular one of the user devices to create a branch of the original discussion and receiving at the server an identification of one or more posts of the original discussion to be included in the branch discussion from the particular one of the user devices; and assigning a unique identification to the branch discussion that is different from that of the original discussion and associating the one or more identified posts of the original discussion with the unique identification of the branch discussion;

communicating a branch discussion data object for the branch discussion from the server to one or more of the plurality of discussion participant user devices, wherein the one or more of the plurality of discussion participant user devices are configured to display the branch discussion and the one or more identified posts of the original discussion on the display screen of the one or more of the user devices along with a selectable link to the original discussion, and wherein the one or more of the plurality of discussion participant user devices are configured to receive the identification of one or more posts of the original discussion prior to displaying the branch discussion; and receiving a new post for the branch discussion from one or more of the plurality of discussion participant user devices and associating the new post with the unique identification of only the branch discussion.

8. The method according to claim 7, wherein said displaying the posts of participants of the original discussion further comprises displaying a title assigned to the original discussion within the user interface.

9. The method according to claim 7, wherein said displaying the branch discussion further comprises displaying a title assigned to the original discussion within the user interface.

10. The method according to claim 9, wherein displaying the title assigned to the original discussion comprises a link for accessing the original discussion.

11. The method according to claim 7, further comprising displaying the title assigned to the branch discussion, wherein the title assigned to the branch discussion comprises a link for accessing the branched discussion.

12. The method according to claim 7, further comprising permitting access to view the posts of the branch discussion by selected users that are not participants of the original discussion.

13. The method according to claim 12, wherein the access to view the posts of the original discussion by selected users is granted by a discussion moderator upon request by a user.

14. The method according to claim 7, wherein selected users that are not participants of the original discussion are selectively given permission by a discussion moderator to become participants of the branch discussion.

15. The method according to claim 7, wherein access to view the posts from the original discussion is limited to participants in the branch discussion that were also participants in the original discussion at the time of branching.

16. The method according to claim 7, wherein said displaying the posts of the original discussion comprises displaying posts of the original discussion in chronological order.

17. The method according to claim 16, wherein replies to posts other than a most-recent post are displayed in chronological order with other posts of the discussion.

18. The method according to claim 16, wherein the branch discussion is indicated as such within the display of the posts of the original discussion.

19. The method according to claim 16, further comprising displaying posts of the branch discussion in chronological order.

20. The method according to claim 7, further comprising displaying a list of branches in the original discussion.

21. The method according to claim 7, further comprising initiating a 1:1 discussion having exactly two participants.

22. The method according to claim 21, wherein 1:1 discussion is automatically assigned a title that indicates the type of the discussion and identifies the two participants.

23. The method according to claim 22, wherein when the 1:1 discussion is restarted, the 1:1 discussion is resumed by default unless a participant of the 1:1 discussion selects to initiate a new 1:1 discussion.

24. The method according to claim 7, further comprising sending an email message to a user with a bookmark link to a post of the original discussion.

25. The method according to claim 7, further comprising receiving at the server an identification of one or more selected participants for the created branch discussion.

26. A system for managing and displaying discussion content in a collaborative data processing environment, comprising a server wherein the server is configured to perform steps of:
- communicating an original discussion data object to a plurality of user devices communicatively connected to the server, the original discussion data object representing an original discussion that includes posts of discussion participants of the original discussion and the user devices being configured to display the posts within a user interface displayed on a display screen of the user devices;
- receiving at the server an instruction from a particular one of the user devices to create a branch of the original discussion and receiving at the server an identification of one or more posts of the original discussion to be included in the branch discussion from the particular one of the user devices;
- assigning a unique identification to the branch discussion that is different from that of the original discussion and associating the one or more identified posts of the original discussion with the unique identification of the branch discussion;
- communicating a branch discussion data object for the branch discussion from the server to one or more of the plurality of discussion participant user devices, wherein the one or more of the plurality of discussion participant user devices are configured to display the branch discussion and the one or more identified posts of the original discussion on the display screen of the one or more of the user devices along with a selectable link to the original discussion, and wherein the one or more of the plurality of discussion participant user devices are configured to receive the identification of one or more posts of the original discussion prior to displaying the branch discussion; and
- receiving a new post for the branch discussion from one or more of the plurality of discussion participant user devices and associating the new post with the unique identification of only the branch discussion.

27. A non-transient computer-readable medium having stored thereon a machine-executable sequence of steps which when executed by a processor causes the processor to perform a method of managing and displaying discussion content in a collaborative data processing environment, comprising steps of:
- communicating an original discussion data object from a server to a plurality of user devices communicatively connected to the server, the original discussion data object representing an original discussion that includes posts of discussion participants of the original discussion and the user devices being configured to display the posts within a user interface displayed on a display screen of the user devices;
- receiving at the server an instruction from a particular one of the user devices to create a branch of the original discussion and receiving at the server an identification of one or more posts of the original discussion to be included in the branch discussion from the particular one of the user devices;
- assigning a unique identification to the branch discussion that is different from that of the original discussion and associating the one or more identified posts of the original discussion with the unique identification of the branch discussion;
- communicating a branch discussion data object for the branch discussion from the server to one or more of the plurality of discussion participant user devices, wherein the one or more of the plurality of discussion participant user devices are configured to display the branch discussion and the one or more identified posts of the original discussion on the display screen of the one or more of the user devices along with a selectable link to the original discussion, and wherein the one or more of the plurality of discussion participant user devices are configured to receive the identification of one or more posts of the original discussion prior to displaying the branch discussion; and
- receiving a new post for the branch discussion from one or more of the plurality of discussion participant user devices and associating the new post with the unique identification of only the branch discussion.

* * * * *